(12) United States Patent
Shiraki et al.

(10) Patent No.: US 7,685,342 B2
(45) Date of Patent: Mar. 23, 2010

(54) STORAGE CONTROL APPARATUS AND METHOD FOR CONTROLLING NUMBER OF COMMANDS EXECUTED IN STORAGE CONTROL APPARATUS

(75) Inventors: Shinjiro Shiraki, Ninomiya (JP); Koji Iwamitsu, Odawara (JP); Hidekazu Aoyama, Odawara (JP); Bunitsu Ando, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 704 days.

(21) Appl. No.: 11/495,755

(22) Filed: Jul. 31, 2006

(65) Prior Publication Data

US 2008/0005490 A1 Jan. 3, 2008

(30) Foreign Application Priority Data

May 31, 2006 (JP) .............................. 2006-152675

(51) Int. Cl.
*G06F 13/12* (2006.01)
*G06F 15/16* (2006.01)
*G06F 13/38* (2006.01)

(52) U.S. Cl. ........................................ 710/74; 709/229
(58) Field of Classification Search .................. 710/74; 709/229
See application file for complete search history.

(56) References Cited

U.S. PATENT DOCUMENTS

| | | | | |
|---|---|---|---|---|
| 6,009,275 | A * | 12/1999 | DeKoning et al. | 710/220 |
| 6,260,120 | B1 * | 7/2001 | Blumenau et al. | 711/152 |
| 6,311,257 | B1 * | 10/2001 | Fitzgerald et al. | 711/170 |
| 6,343,324 | B1 * | 1/2002 | Hubis et al. | 709/229 |
| 6,745,281 | B1 * | 6/2004 | Saegusa | 711/112 |
| 7,069,353 | B2 | 6/2006 | Shiraki et al. | 710/36 |
| 2002/0103923 | A1 | 8/2002 | Cherian et al. | 709/235 |
| 2004/0111527 | A1 | 6/2004 | Czap, Jr. et al. | 709/235 |
| 2005/0165938 | A1 * | 7/2005 | Cornett | 709/229 |
| 2005/0223138 | A1 | 10/2005 | Shiraki et al. | 710/36 |

FOREIGN PATENT DOCUMENTS

JP 2005-322181 11/2005

OTHER PUBLICATIONS

J. Satran et al "Internet Small Computer Systems Interface (ISCSI)", Network Working Group, IETF Stanger, Internet Engineering Task Force, IETF, Standards Track, Apr. 2004, pp. 1-257.

* cited by examiner

*Primary Examiner*—Henry W. H. Tsai
*Assistant Examiner*—Tushar S Shah
(74) *Attorney, Agent, or Firm*—Brundidge & Stanger, P.C.

(57) ABSTRACT

A storage control apparatus of the present invention controls the number of multiple commands issued from a host machine without shutting down the host machine. A communication port of the storage control apparatus carries out communications with the hosts in accordance with the iSCSI protocol. Command processing resources are managed for each communication port. A resource allocation control part calculates the number of commands capable of being received on the basis of the remaining amount of command processing resources inside shared port resources, a change in the number of commands received from a host, communication delay time, and the state of execution of a command issued from a host or the like. A MaxCmdSN is calculated by adding the results of command processing by a command execution part and the receivable number calculated by the resource allocation control part to the value of the latest CmdSN received from a host. The storage control apparatus adds the MaxCmdSN to a transmission frame and transmits it to the host.

20 Claims, 17 Drawing Sheets n: NUMBER OF PROCESSABLE COMMANDS n: INITIAL VALUE

| CONNECTION MANAGEMENT TABLE |
|---|
| CONNECTION MANAGEMENT INFORMATION (INCLUDING iSCSI Name) |
| NUMBER OF SECURED PROCESSING RESOURCES (AR) |
| NUMBER OF EXECUTED COMMANDS (ENc) |
| NUMBER OF EXECUTED COMMANDS HISTORY |
| STEADY STATE FLAG |
| RECEIVED CmdSN |
| REPORTED MaxCmdSN |
| EXECUTED NUMBER ZERO START TIME |
| EXECUTED NUMBER ZERO TIME PERIOD |

T41

| NUMBER OF EXECUTED COMMANDS HISTORY TABLE |
|---|
| NUMBER OF EXECUTED COMMANDS (0) |
| NUMBER OF EXECUTED COMMANDS (1) |
| NUMBER OF EXECUTED COMMANDS (2) |
| ... |
| NUMBER OF EXECUTED COMMANDS (AR-1) |

| BY-PORT NUMBER OF EXECUTION CONNECTIONS TABLE |
|---|
| NUMBER OF EXECUTION CONNECTIONS (EC) |

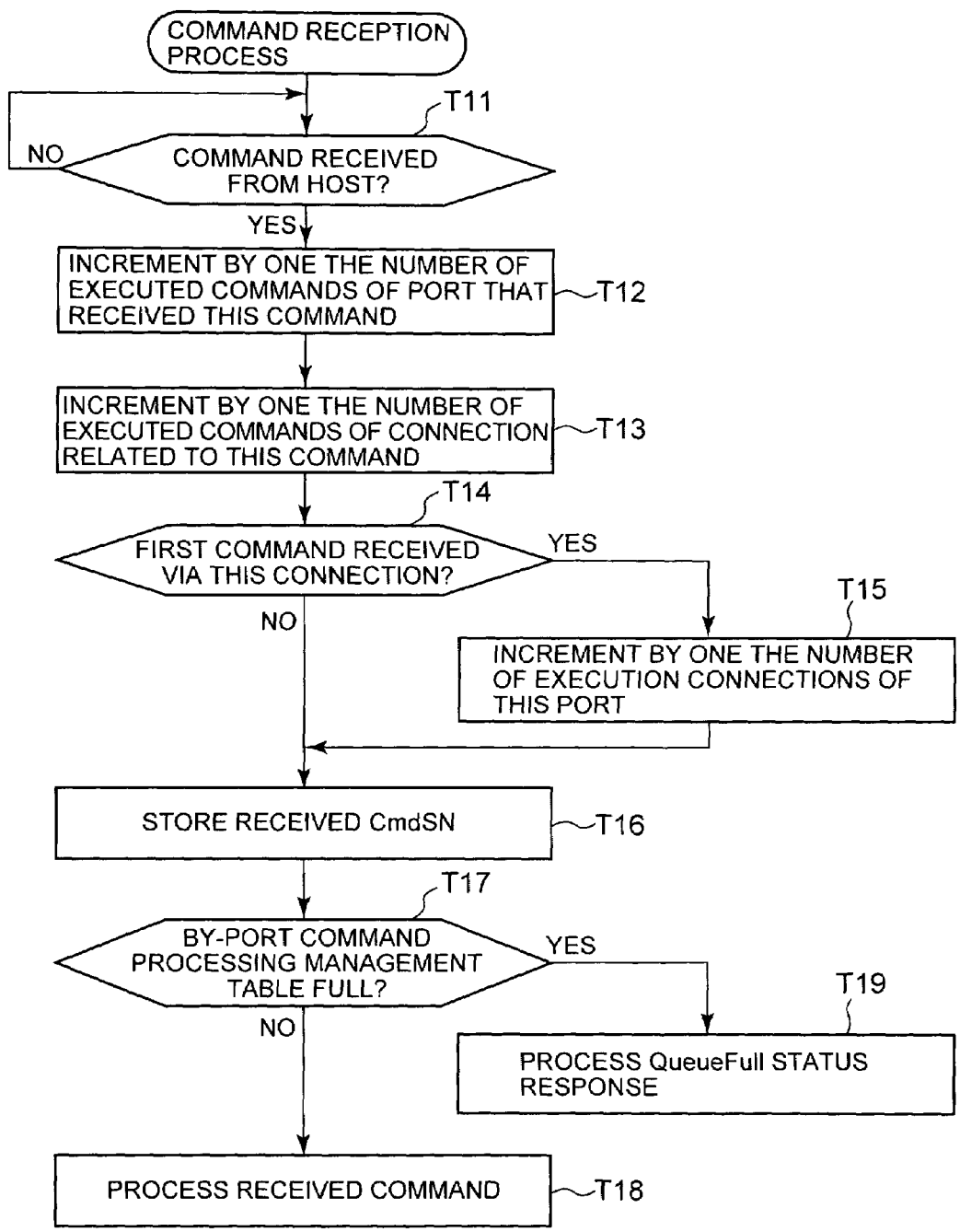

| BY-PORT PRIORITY MANAGEMENT TABLE ||
|---|---|
| iSCSI Name | PERCENTAGE (%) |
| IN(0) | Q(0) |
| IN(1) | Q(1) |
| IN(2) | Q(2) |
| ... | ... |
| IN(n-1) | Q(n-1) |

STORAGE CONTROL APPARATUS AND METHOD FOR CONTROLLING NUMBER OF COMMANDS EXECUTED IN STORAGE CONTROL APPARATUS

CROSS-REFERENCE TO PRIOR APPLICATION

This application relates to and claims priority from Japanese Patent Application No. 2006-152675, filed on May 31, 2006, the entire disclosure of which is incorporated herein by reference.

BACKGROUND OF THE INVENTION

1. Field of the Invention

The present invention relates to a storage control apparatus, and a method for controlling the number of commands executed in the storage control apparatus.

2. Description of the Related Art

A storage control apparatus, for example, is constituted by arranging a large number of disk drives in an array, and provides a storage area based on RAID (Redundant Array of Independent Disks). A logical volume, which is a logical storage area, is formed in the physical storage area of each disk drive. A host computer (hereinafter, host) can read and write data between desired volumes by issuing a write command or read command to the storage control apparatus.

A storage control apparatus comprises a plurality of communication ports, and each of these communication ports can be connected to either respectively different hosts or to the same host. In addition, a single communication port can also be connected to a plurality of hosts by connecting the storage control apparatus and hosts via a switch.

Each host can issue multiple commands. The issuing of multiple commands means a host consecutively issues a plurality of commands without waiting for a response from a storage control apparatus. The number of commands that a storage control apparatus can process simultaneously depends on the amount of command processing resources that the storage control apparatus possesses. When the number of commands issued by a host exceeds the number of commands capable of being processed by a storage control apparatus, a QueueFull state results. When a storage control apparatus notifies a host to the extent that a QueueFull state exists, the host stops issuing multiple commands, causing performance to deteriorate.

To prevent the occurrence of a QueueFull state, a constitution, which provides a storage control apparatus with more command processing resources, can be considered. However, this approach is not a realistic solution, as it would require that a great deal of memory resources, hardware circuitry and other such command processing resources be provided in large numbers. Accordingly, technology designed to prevent the occurrence of a QueueFull state without adding command processing resources has been proposed (Japan Laid-open Patent No. 2005-322181).

In the prior art disclosed in this literature, a total value for the number of multiple commands (the number of multiple commands capable of being issued) is set in each host, and this total value controls access from each host so as not to exceed the number of commands capable of being processed by a storage control apparatus. In the prior art, this prevents the occurrence of a QueueFull state.

In the prior art disclosed in this literature, a number of multiple commands must be set in each host so that the number of commands does not exceed the processing capabilities of a storage command system. When the set number of multiple commands is to be changed, the host must be stopped before the new number of multiple commands is set, and then the host must be restarted. Therefore, in the prior art, the number of multiple commands setting cannot be changed in a state wherein a host application program continues to run as-is. For this reason, in the prior art disclosed in the above-mentioned literature, a number of multiple commands setting cannot be changed, and a host cannot be added without stopping a host, resulting in low usability.

In response to this, if the number of multiple commands of the host side is not adjusted to the number of commands capable of being processed by a storage control apparatus, the storage control apparatus notifies the hosts of the number of commands capable of being processed. Therefore, the total number of processable commands notified to the respective hosts will be higher than the actual number of commands capable of being processed. As a result, the storage control apparatus will receive commands in excess of the number of commands it is capable of processing, resulting in frequent QueueFull states, and inviting performance degradation.

SUMMARY OF THE INVENTION

Accordingly, an object of the present invention is to provide a storage control apparatus and a method for controlling the number of commands executed in a storage control apparatus constituted such that the number of multiple commands issued by a host machine can be properly controlled without stopping the host machine or changing the system configuration. Another object of the present invention is to provide a storage control apparatus and a method for controlling the number of commands executed in a storage control apparatus constituted such that situations in which a storage control apparatus notifies a host machine of a QueueFull state can be held in check, and performance degradation can be prevented by virtue of adjusting the receivable number of commands that a storage control apparatus notifies to a host machine corresponding to the communication delay time between the storage control apparatus and the host machine. Additional objects of the present invention should become clear from the disclosures of the embodiments to be described hereinbelow.

To solve for the above-mentioned problems, a storage control apparatus according to one aspect of the present invention is a storage control apparatus, which is capable of being connected to a plurality of host machines, each of which issues commands, and which comprises a plurality of communication ports for carrying out communications with respective host machines respectively, and a control part for processing various commands received from the respective host machines via the communication ports, and for respectively transmitting these processing results to each host machine, wherein the control part: (1) secures command processing resources for processing commands from among the shared port resources provided in each communication port, and allocates the command processing resources to the respective host machines; (2) respectively notifies each host machine of the receivable number, which shows the number of commands that can be received from each host machine, based on this allocated amount of command processing resources; and (3) respectively controls, on the basis of the communication delay time between the respective communication ports and the respective host machines, the amount of command processing resources allocated to each host machine.

In an aspect of the present invention, the control part respectively allocates the command processing resources to the host machines such that the host machines can issue multiple the commands.

In an aspect of the present invention, the control part approximately uniformly allocates the command processing resources of the shared port resources among the command-executing host machines of the respective host machines.

In an aspect of the present invention, the control part maintains the command processing resources allocated to the respective host machines until the communication delay time reaches a preset prescribed response time, even when the number of commands to be issued from the host machines decreases to or below a prescribed value.

In an aspect of the present invention, the control part distributes shared port resources among the respective host machines based on a preset order of priority.

In an aspect of the present invention, the control part returns a portion of the command processing resources allocated to the respective host machines to the shared port resources when the remaining amount of shared port resources is not more than a preset prescribed value.

In an aspect of the present invention, the constitution is such that the control part returns all of the command processing resources allocated to a host machine to the shared port resources when the number of commands to be executed by the host machine decreases to a prescribed value.

In an aspect of the present invention, the control part reduces the receivable number to be notified once again to the respective host machines by returning a portion of the command processing resources allocated to the respective host machines to the shared port resources, when the total receivable number to be notified to the respective host machines exceeds the maximum amount of shared port resources.

In an aspect of the present invention, the control part returns a portion of the command processing resources allocated to the respective host machines to the shared port resources so that command processing resources can be approximately uniformly allocated to the host machines when the remaining amount of shared port resources is not more than a preset prescribed value.

In an aspect of the present invention, the control part returns the command processing resources to be allocated to a host machine to the shared port resources in accordance with a decrease in the number of commands issued from the host machine.

In an aspect of the present invention, the control part monitors the changing state of the number of commands issued from a host machine, and returns all of the command processing resources allocated to a host machine to the shared port resources when the number of commands transitions from a steady state to a decreasing state.

In an aspect of the present invention, the constitution is such that, when a command is received from a host machine, the control part determines whether or not the remaining amount of shared port resources exceeds a preset prescribed threshold value, and when it determines that the remaining amount exceeds the threshold value, it adds command processing resources to be allocated to the host machine, and when it determines that the remaining amount is less than the threshold value, it reduces command processing resources to be allocated to the host machine.

In an aspect of the present invention, the host machines issue commands by making a sequence number for identifying the command issuing order correspond to a command, and the control part calculates the receivable number by adding the amount of command processing resources allocated to a host machine to the sequence number when it responds to the host machine with the results of processing a command received from the host machine.

In an aspect of the present invention, the communication ports carry out communications with the respective host machines using the iSCSI protocol.

A storage control apparatus according to another aspect of the present invention comprises a plurality of communication ports, which are respectively connected via an iSCSI protocol to a plurality of host machines, each of which issues commands; a superordinate communication part, which communicates with the respective host machines via the respective communication ports; a subordinate communication part, which communicates with a storage device; a cache memory, which is used by the superordinate communication part and the subordinate communication part; a control memory, which stores control information for managing a command processing resource for processing a command; and a control part, which is connected to each of the superordinate communication part, subordinate communication part, cache memory, and control memory, and which processes each command that the superordinate communication part receives via a communication port from the respective host machines, and notifies the respective host machines of the results of this processing from the superordinate communication part via the communication port, wherein the constitution is such that the control part: (1) allocates to each of the prescribed host machines a plurality of command processing resources from among the shared port resources, which are provided to each of the respective communication ports, so that they become approximately uniform among the command-executing prescribed host machines of the host machines sharing the communication ports; (2) respectively calculates the receivable number, which shows the number of commands capable of being received from the prescribed host machines, by adding to the amount of command processing resources allocated to the prescribed host machines the sequence number for showing the command issuing order notified from each prescribed host machine, and respectively notifies the prescribed host machines of this calculated receivable number; and (3) returns the command processing resources to be allocated to the prescribed host machines to the shared port resources in accordance with a reduction in the number of commands issued from the prescribed host machines.

A method for controlling the number of commands executed in a storage control apparatus according to yet another aspect of the present invention comprises shared port resources for managing, by communication port, a command processing resource for processing commands received from a host machine, and respectively executes a step for allocating a command processing resource so that a host machine, which uses a communication port, can issue multiple commands; a step for receiving a sequence number showing a command from a host machine, and the order of this command; a step for storing a sequence number; a step for determining whether or not there is free space on a command processing resource allocated to a host machine; a step for notifying a host machine to the effect that processing is not possible when free space does not exist in a command processing resource; a step for processing a received command when free space does not exist in a command processing resource, using this available command processing resource; a step for comparing the remaining amount of shared port resources with a prescribed threshold value; a step for increasing the amount of command processing resources to be allocated to a host machine by securing a first prescribed amount of command processing resources from the remaining amount of shared port resources and allocating it to a host machine when the remaining amount of shared port resources is greater than a prescribed threshold value; a step for decreasing the amount of command processing resources allocated to a host machine by returning to the shared port resources a second prescribed amount of command processing resources from among the command processing resources already allocated to the host machine, when the remaining amount of shared port resources is not more than a prescribed threshold value; a step for calculating, on the basis of the amount of command processing resources allocated to a host machine, and a received sequence number, a receivable number, which shows the number of commands capable of being received from a host machine; and a step for transmitting to a host machine a calculated receivable number and the processing results of a received command.

When the total value of a receivable number transmitted to a plurality of host machines exceeds the maximum amount of shared port resources, a step for setting the prescribed threshold value high can also be provided.

This aspect of the present invention can also comprise a step for monitoring a change in the number of commands issued from a host machine; a step for determining whether or not the number of commands has transitioned from a steady state to a decreasing state; and a step for returning to the shared port resources all of the command processing resources allocated to a host machine when it is determined that the number of commands has transitioned from a steady state to a decreasing stated.

A storage control apparatus according to another aspect of the present invention is a storage control apparatus, which is capable of being connected to a plurality of host machines, each of which issues commands, and which comprises a plurality of communication ports for communicating with the above-mentioned host machines, and a control part, which processes the respective commands received from the above-mentioned host machines via the above-mentioned communication ports, and which transmits these processing results to the above-mentioned host machines, wherein the above-mentioned control part: (1) secures, from among shared port resources provided for each of the above-mentioned communication ports, command processing resources for processing the above-mentioned commands, and allocates them to the respective above-mentioned host machines; and (2) notifies the above-mentioned host machines of a receivable number, which shows the number of commands capable of being received from said host machines, based on the amount of these above-mentioned allocated command processing resources.

There are circumstances in which the functionality, means and steps of the present invention can be constituted either entirely or in part by a computer program. In addition to being able to be affixed on a storage medium and transferred, this computer program can also be transmitted via the Internet or some other such communication network.

BRIEF DESCRIPTION OF THE DRAWINGS

FIG. 7 is a schematic diagram showing a table for managing a host connected to respective ports;

FIG. 8 is a schematic diagram showing a table for managing a number of command-issuing hosts from among the hosts connected to the respective ports;

FIG. 9 is a flowchart showing the process when a storage control apparatus receives a command from a host;

FIG. 19 is a schematic diagram showing a table for managing the priorities of hosts by port.

DETAILED DESCRIPTION OF THE PREFERRED EMBODIMENT

An embodiment of the present invention will be explained below based on the figures. In this embodiment, as will be explained hereinbelow, command processing resources of a storage control apparatus are respectively managed in communication port units, and a command processing resource allocated to each host is dynamically managed inside the storage control apparatus based on changes in the number of commands issued from a host and arrival times.

Figure 1:
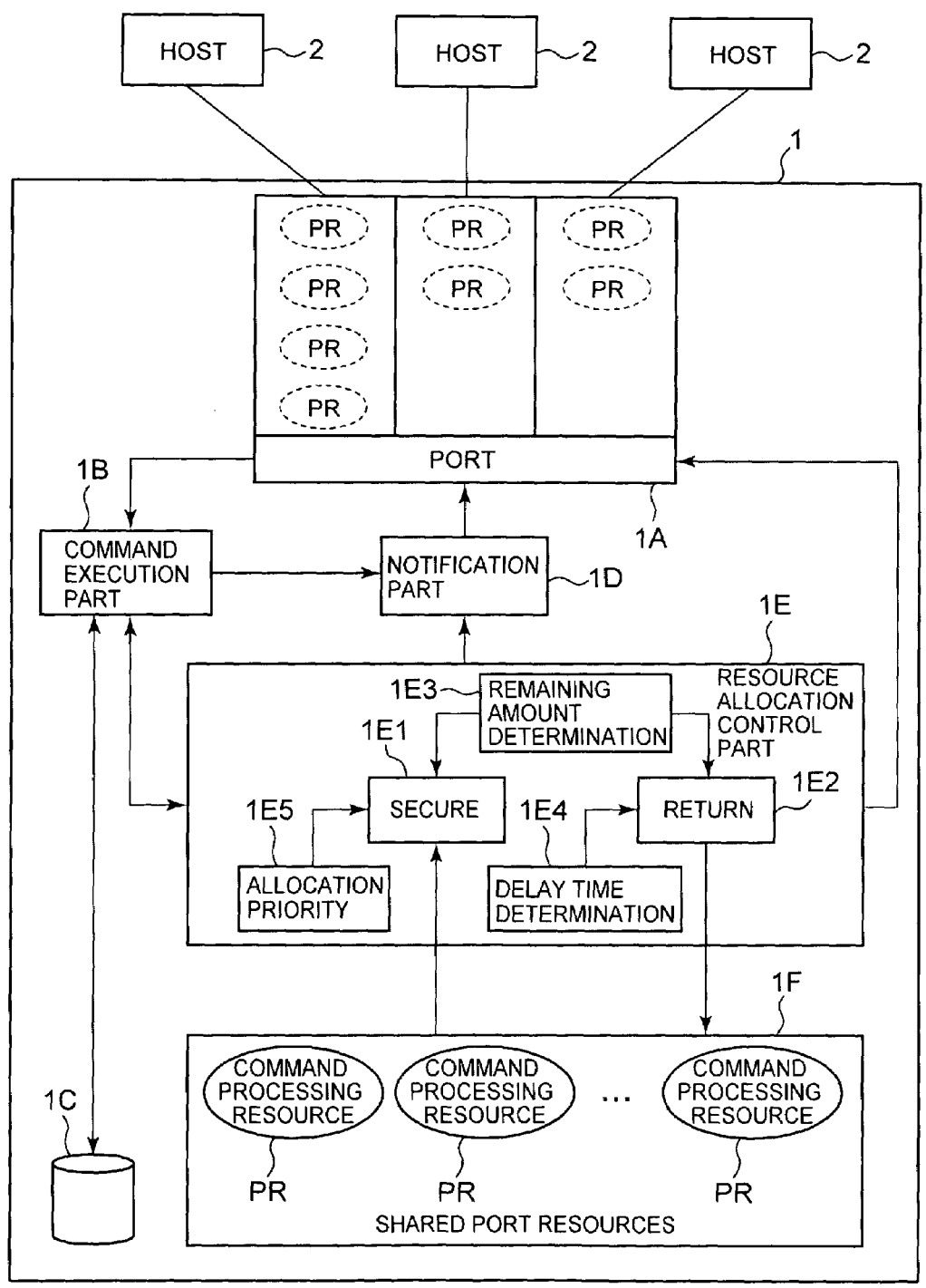
FIG. 1 is a schematic diagram showing the concept of an embodiment of the present invention.

FIG. 1 is a schematic diagram showing an overall concept of this embodiment. The storage system of this embodiment, for example, is constituted comprising at least one or more storage control apparatuses 1, and a plurality of hosts 2.

The hosts 2, for example, are constituted as computer systems, such as server computers, and are each connected to a communication port 1A of a storage control apparatus 1. In FIG. 1, the hosts 2 are shown as being directly connected to one communication port 1A, but in actuality, they are connected via an intermediate device, such as a switching device.

A storage control apparatus 1, for example, can be constituted comprising a communication port 1A, a command execution part 1B, a storage device 1C, a notification part 1D, a resource allocation control part 1E, and shared port resources 1F. Furthermore, the physical constitution and the logical constitution of the storage control apparatus 1 will each be explained below.

The communication port 1A is for carrying out communications with the hosts 2. In FIG. 1, only one communication port 1A is shown, but a storage control apparatus 1 can comprise a plurality of communication ports 1A. The communication port 1A, for example, carries out communications with the hosts 2 based on the iSCSI protocol.

The command execution part 1B is for processing commands received from the hosts 2 via the communications port 1A. A write command and a read command can be given as examples of commands. The storage device 1C is for storing data used by a host 2. As examples of a storage device 1C, a hard disk device, a semiconductor memory device, a magnetic tape device, a flexible disk device, an optical disk device, and a magneto-optical disk device can be given.

When a write command is issued from a host 2, the command execution part 1B writes the write data received from the host 2 to the storage device 1C. When a read command is issued from a host 2, the command execution part 1B reads out from the storage device 1C the data requested from the host 2.

The notification part 1D notifies the respective hosts 2 via the communication port 1A of the results of command processing executed by the command execution part 1B, and the command receivable number calculated by the resource allocation control part 1E. The command receivable number is the number of commands capable of being received from this host 2, and a storage control apparatus 1 can receive and process a command receivable number's worth of commands from a host 2 (hereinafter, command receivable number may be abbreviates as "receivable number").

The resource allocation control part 1E is for allocating to the hosts 2 the command processing resources PR inside the shared port resources 1F managed by each communication port 1A. Command processing resource PR signifies a software resource and hardware resource utilized for processing a command received from a host 2, and a control table for managing a received command can be given as an example.

The shared port resources 1F manages the respective command processing resources PR in each communication port 1A. That is, all of the command processing resources PR of a storage control apparatus 1 are managed in each communication port 1A as shared port resources 1F.

The resource allocation control part 1E allocates command processing resources PR managed as shared port resources 1F of a communication port 1A to the respective hosts 2 connected to this communication port 1A. The resource allocation control part 1E, for example, can comprise a function 1E1 for securing a command processing resource PR; a function 1E2 for returning a command processing resource PR to shared port resources 1F; a function 1E3 for determining the amount of command processing resources PR remaining in the shared port resources 1F; a function 1E4 for determining the communication delay time between a host 2 and a communication port 1A; and a function 1E5 for managing the priorities of the hosts 2.

The resource securing function 1E1, for example, is a function for allocating command processing resources PR to the hosts 2 based on the amount of command processing resources PR remaining in shared port resources 1F (remaining amount or residual number) and the order of priority preset in the hosts 2.

For example, the resource securing function 1E1 can approximately uniformly distribute command processing resources PR inside the shared port resources 1F to the hosts 2 such that the hosts 2 can issue multiple commands. Further, the resource securing function 1E1 can distribute command processing resources PR inside the shared port resources 1F to the hosts 2 such that more command processing resources PR are allocated the higher the priority.

The resource returning function 1E2, for example, is a function for returning to the shared port resources 1F either all or a portion of the command processing resources PR allocated to the hosts 2 based on the amount of command processing resources PR remaining in the shared port resources 1F and the communication delay time. Returning command processing resources PR to the shared port resources 1F signifies the canceling of the allocation state of command processing resources PR already allocated to a host 2, and changing the allocatable state in the other hosts 2.

For example, when the remaining amount of command processing resources PR inside shared port resources 1F (that is, the free command processing resources PR, which have not been allocated to any host 2) decreases, the resource returning function 1E2 can return to the shared port resources 1F a portion of the command processing resources PR already allocated to the hosts 2. Further, when a host 2 finishes issuing commands, the resource returning function 1E2 can return to the shared port resources 1F all of the command processing resources PR that have been allocated to this host 2. In addition, the resource returning function 1E2 can maintain as-is the command processing resources PR allocated to this host 2 until a prescribed response time (communication delay time) has elapsed even when commands are no longer arriving from the host 2. Further, when the number of commands arriving from a host 2 decreases, the resource returning function 1E2 can also return to the shared port resources 1F either all or a portion of the command processing resources PR that have been allocated to this host 2.

The remaining amount determining function 1E3 compares the amount of command processing resources PR inside the shared port resources 1F against a prescribed threshold value, and outputs this determination result. As will be described in the embodiment to be explained hereinbelow, the prescribed threshold value can be adjusted based on the receivable number notified to the hosts 2, and the maximum number of processable commands for this communication port 1A. The maximum number of processable commands for this communication port 1A signifies the maximum amount of command processing resources PR capable of being managed by the shared port resources 1F of this communication port 1A. In the following explanation, there will be times when the maximum number of commands capable of being processed in each communication port 1A will be called "command processable number".

The delay time determination function 1E4 compares the communication delay time of when commands issued from the hosts 2 arrive at the communication port 1A against a prescribed response time, and outputs this determination result. The delay time determination function 1E4, for example, can be made to operate when the distance between a host 2 and a storage control apparatus 1 is long. By contrast, there is no need to operate the delay time determination function 1E4 when the distance between a host 2 and a storage control apparatus 1 is relatively short, and the communication delay time can be ignored.

For example, when a host 2 and a storage control apparatus 1 are far apart, it takes time until the communication port 1A receives a command issued from a host 2. Therefore, there are cases when a command received at the storage control apparatus 1 from a host 2 is temporarily interrupted by this communication delay time, and the number of commands executed inside the storage control apparatus 1 relative to this host 2 is 0. In this case, when a command processing resource PR allocated to this host 2 is returned to the shared port resources 1F, this returned command processing resource PR is allocated to another host 2. A host 2 for which allocation of a command processing resource PR is to be canceled is notified of the receivable number prior to the cancellation of allocation. As a result of this, there is the likelihood that the total value of the receivable number notified to the hosts 2 will exceed the maximum amount of command processing resources of the shared port resources 1F, causing a Queue-Full state. Accordingly, the constitution is such that the storage control apparatus 1 maintains as-is the command processing resources PR allocated to a host 2 until a prescribed communication delay time elapses even when the arrival of a command from this host 2 is interrupted.

The priority management function 1E5 manages the respective orders of priority of the hosts 2. A priority can either be set manually by an administrator, or it can be set automatically. For example, the constitution can be such that an order of priority is determined automatically on the basis of the type of application program running on a host 2, the type of storage device an application program is using, or the type of a volume.

Next, the operation of a storage control apparatus 1 according to this embodiment will be explained. First of all, the resource allocation control part 1E allocates command processing resources PR to the respective hosts 2 connected to a communication port 1A.

Here, the resource allocation control part 1E allocates a plurality of command processing resources PR to each host 2 so that the respective hosts 2 can issue a plurality of multiple commands. Thus, the hosts 2 can continue issuing commands without waiting for a response from the storage control apparatus 1. Further, the resource allocation control part 1E can also allocate command processing resources PR only to the command-issuing hosts 2 (command-executing host 2) of the hosts 2 connected to a communication port 1A.

A host 2 can issue either one or a plurality of commands. When a host 2 and a storage control apparatus 1 are in communication using the iSCSI (internet Small Computer System Interface) protocol, a command-issuing host 2 is the initiator, and the command-receiving storage control apparatus 1 constitutes the target.

The initiator host 2 attaches a serial number (CmdSN) to a SCSI command frame, and transmits the SCSI command frame to the storage control apparatus 1. The frame, which is formed by encapsulating an SCSI command, is transmitted to the storage control apparatus 1 from the host 2 by way of a TCP/IP (Transmission Control Protocol/Internet Protocol) network. A switch, router and other such intermediate devices can be provided in this network.

When a communication port 1A receives a command issued from a host 2, the command execution part 1B processes the command using a command processing resource PR and storage device 1C allocated to this host 2.

The resource allocation control part 1E, for example, calculates a receivable number based on the remaining amount of command processing resources PR inside the shared port resources 1F, changes in the number of commands received from this host 2, communication delay time, the execution status of commands issued from this host 2 (how many commands are being processed), and the order of priority set in this host 2.

The notification part 1D transits to a host 2 the results of command processing by the command execution part 1B, and the receivable number calculated by the resource allocation control part 1E. Here, the notification part 1D calculates the MaxCmdSN by adding the receivable number to the value of the latest CmdSN received from this host 2, attaches this MaxCmdSN to a transmission frame, and transmits it of the host 2. A MaxCmdSN is information indicating how many commands an initiator (that is, a host 2) is capable of issuing from this point on. A host 2 can continue to issue commands until it reaches the value indicated by the MaxCmdSN.

The method for allocating a command processing resource PR used by the resource allocation control part 1E will be explained further hereinbelow. For example, simply put, a command processing resource PR can be allocated according to a policy such as that below.

(1) Securing a Resource (1-1) Allocate a plurality of command processing resources PR to each of the hosts 2 so that the respective hosts 2 can issue multiple commands.

(1-2) Allocate command processing resources PR approximately uniformly to the command-executing hosts 2 among the hosts 2 connected to the communication port 1A.

(1-3) Distribute command processing resources PR among the hosts 2 such that the total value of the receivable number notified to the hosts 2 does not exceed the total amount (maximum value) of the command processing resources PR of the shared port resources 1F.

(1-4) When considerable communication delay time exists between a host 2 and the storage control apparatus 1 (when the distance between a host 2 and the storage control apparatus 1 is long), maintain command processing resources PR already allocated to a host 2 without returning them to the shared port resources 1F until a prescribed time has elapsed, even when the arrival of a command has been interrupted.

(1-5) When an order of priority has been set for the hosts 2, distribute the command processing resources PR inside the shared port resources 1F to the hosts 2 in accordance with the order of priority.

(2) Returning a Resource (2-1) When the command processing resources PR inside the shared port resources 1F constitute 0, return a portion of the command processing resources PR already allocated to the hosts 2 to the shared port resources 1F.

(2-2) When the command execution number for executing a command issued from a host 2 becomes 0, return all of the command processing resources PR allocated to this host 2 to the shared port resources 1F.

(2-3) When the total value of the receivable number notified to the hosts 2 exceeds the total amount of command processing resources PR of the shared port resources 1F, reduce the receivable number notified to the hosts 2, and return the command processing resources PR to the shared port resources 1F.

(2-4) When the remaining amount of command processing resources PR inside the shared port resources 1F constitutes 0, reduce the command processing resources PR allocated to command-executing hosts 2 and return them to the shared port resources 1F until reaching the value obtained by dividing the total amount of shared port resources 1F by the number of hosts 2 executing commands.

(2-5) When considerable communication delay time does not exist between a host 2 and the storage control apparatus 1 (when the distance between a host 2 and the storage control apparatus 1 is short), and when the number of commands arriving from a host 2 has diminished, return all of the command processing resources PR allocated to this host 2 to shared port resources 1F before the number of commands being executed relative to this host 2 becomes 0.

Because this embodiment is constituted as described hereinabove, it achieves the following effect. The storage control apparatus 1 manages command processing resources PR by communication ports 1A, allocates the command processing resources PR to the hosts 2, and notifies the hosts 2 of the receivable number. The hosts 2 issue commands based on the receivable number notified from the storage control apparatus 1.

Therefore, in this embodiment, the number of commands issued from the hosts 2 can be indirectly controlled by virtue of a MaxCmdSN transmitted from the storage control apparatus 1 to the respective hosts 2. Accordingly, it is possible to reduce the likelihood of receiving from the hosts 2 a number of commands in excess of the number of commands capable of being processed by the storage control apparatus 1, and inhibiting the storage control apparatus 1 from constituting a QueueFull state. As a result, it is possible to prevent performance degradation, and enhance the reliability of the storage control apparatus 1.

Further, due to a constitution that controls the number of commands issued from the respective hosts 2 by virtue of a MaxCmdSN transmitted to the hosts 2 from the storage control apparatus 1, it is possible to add and connect a new host to the storage control apparatus 1 without changing the number of multiple commands on the host 2 side, and to change the configuration of the hosts 2 already connected to the storage control apparatus 1. That is, in this embodiment, a host 2 can be added, and the configuration can be changed while online, without stopping a host 2, thus enhancing usability.

In this embodiment, when the storage control apparatus 1 and host 2 are far apart, that is, when considerable delay time exists, the command processing resources PR allocated to this host 2 will be maintained as-is until a prescribed time period has elapsed, even when the number of commands executed relative to this host 2 (command execution number) becomes 0.

Therefore, even when a command to arrive at the storage control apparatus 1 from a host 2 is temporarily interrupted, it is possible to prevent the return to the shared port resources 1F of the command processing resources PR allocated to this host 2. As a result, the likelihood of the total value of the receivable number notified to the hosts 2 exceeding the total amount of shared port resources 1F can be reduced, and a QueueFull state can be prevented.

In this embodiment, when the storage control apparatus 1 and a host 2 are in close proximity, that is, when considerable communication delay time does not exist, the command processing resources PR allocated to this host 2 are reduced in accordance with a reduction in the number of commands arriving from the host 2. Therefore, command processing resources PR allocated to this host 2 can be allocated to another host 2 prior to the issuing of multiple commands by a certain host 2 being completely over. As a result, the command processing resources PR being managed by communication port 1A can be efficiently utilized, and performance degradation can be prevented.

In this embodiment, an order of priority can be set for the hosts 2, and command processing resources PR can be allocated in accordance with the order of priority. Therefore, on the storage control apparatus 1 side, command processing resources PR can be properly distributed in accordance with the order of priority of the hosts 1. This embodiment will be explained in detail hereinbelow.

First Embodiment

Figure 2:
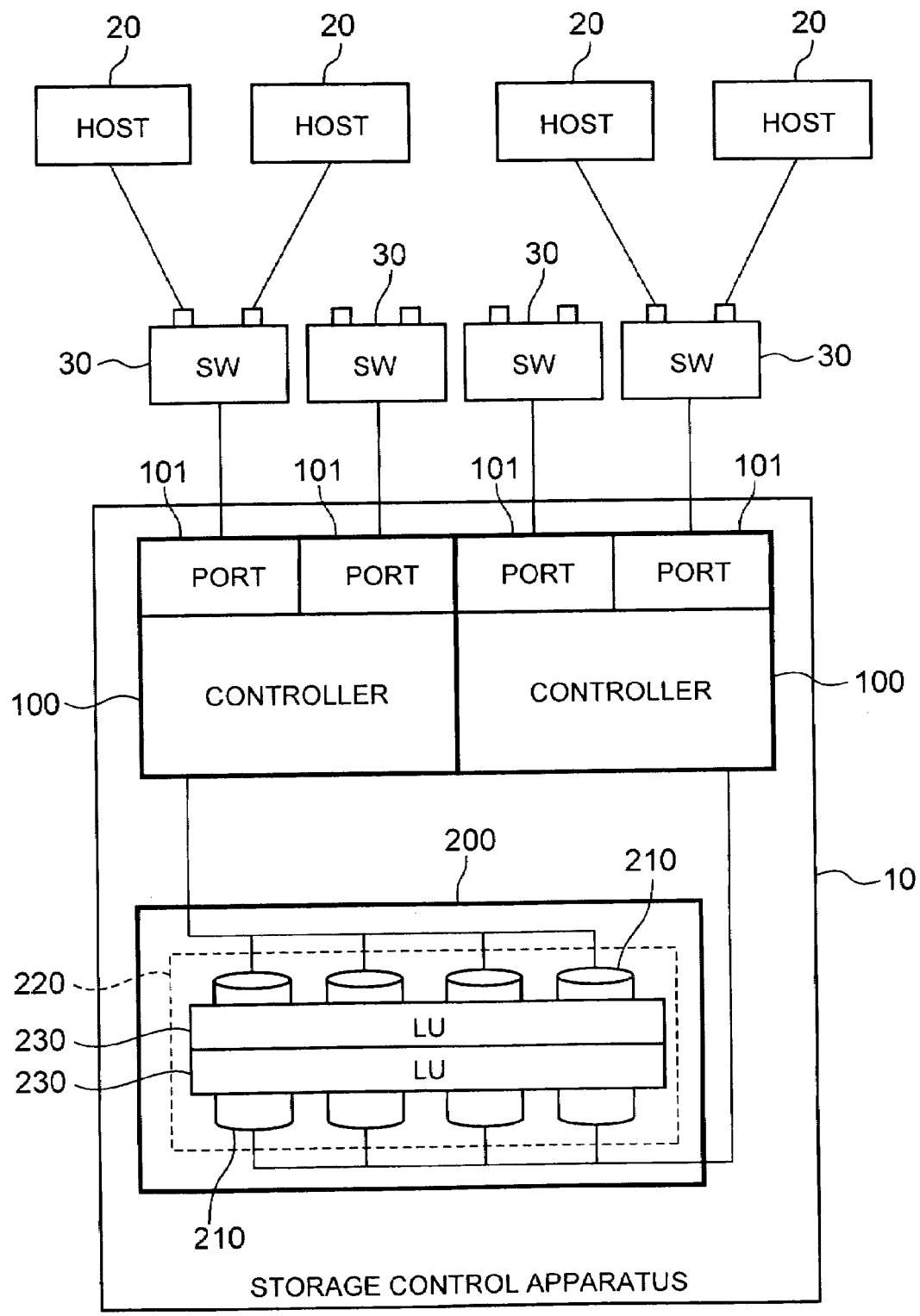
FIG. 2 is a block diagram showing the overall constitution of a storage system.

FIG. 2 is a schematic diagram showing the overall constitution of a storage system comprising a storage control apparatus 10 according to this embodiment. This storage system, for example, can be constituted comprising at least one or more storage control apparatuses 10, a plurality of hosts 20, and at least one or more switches 30. Further, as will be explained below, the storage control apparatus 10 comprises a controller 100 having a communication port 101, and a storage part 200 having a storage device 210.

As an explanation of the corresponding relationship with FIG. 1, the storage control apparatus 10 corresponds to the storage control apparatus 1 in FIG. 1, a host 20 corresponds to a host 2 in FIG. 1, a communication port 101 corresponds to the communication port 1A in FIG. 1, and a storage device 210 corresponds to the storage device 1C in FIG. 1. The command execution part 1B, notification part 1D, resource allocation control part 1E, and shared port resources 1F in FIG. 1 are each achieved as functions of the controller 100.

The network constitution will be explained. As shown in FIG. 2, the storage control apparatus 10 comprises a plurality of communication ports 101. Either one or a plurality of hosts 20 is respectively connected to the communication ports 101 by way of switches 30. In the figure, for the sake of convenience, hosts 20 are only connected to the switches 30 on the left and right, but a plurality of hosts 20 can be connected to each switch 30. Therefore, a plurality of hosts 20 can be connected via switches 30 to the communication ports 101.

The overall constitution of the storage control apparatus 10 will be briefly explained. The storage control apparatus 10 comprises a plurality (for example, 2) controllers 100. The controllers 100 comprise the same constitution, and respectively control the operation of the storage control apparatus 10. The controllers 100 each comprise a plurality of communication ports 101, and are connected to a plurality of hosts 20 via the communication ports 101. These controllers 100 can back up each other, so that even if one controller 100 malfunctions, the other controller 100 can continue the operation of the storage control apparatus 10. That is, the storage control apparatus 10 employs a dual controller structure comprising a plurality of controllers 100, heightening fault tolerance. The constitution of a controller 100 will be explained below together with FIG. 3.

The storage part 200 is for providing storage capacity. The storage part 200 comprises a plurality of storage devices 210. As a storage device 210, for example, a hard disk device, a semiconductor memory device, an optical disk device, a magneto-optic disk device, a magnetic tape device, a flexible disk device, and various other devices capable of reading and writing data can be used.

When a hard disk device is utilized as a storage device, for example, an FC (Fibre Channel) disk, SCSI (Small Computer System Interface) disk, a SATA disk, an ATA (AT Attachment) disk, a SAS (Serial Attached SCSI) disk or the like can be used. When a semiconductor memory device is used as a storage device, for example, a flash memory, FeRAM (Ferroelectric Random Access Memory), a MRAM (Magnetoresistive Random Access Memory), OUM (Ovonic Unified Memory), RRAM (Resistance RAM) and various other such memory devices can be used.

A RAID Group (Parity Group) 220 can be constituted using a plurality of storage devices 210. Then, a logical volume 230 can be set up so as to span the plurality of storage devices 210 inside the RAID Group 220. Furthermore, either one or a plurality of logical volumes 230 can be established on one storage device 210. The hosts 20 recognize a logical volume 230 as an access target, and carry out the reading and writing of data relative to a logical volume 230.

Furthermore, in FIG. 2, a case in which a storage part 200 is provided inside the storage control apparatus 10 is shown, but the present invention is not limited to this, and a storage part 200 can also be provided outside the enclosure of the storage control apparatus 10.

Figure 3:
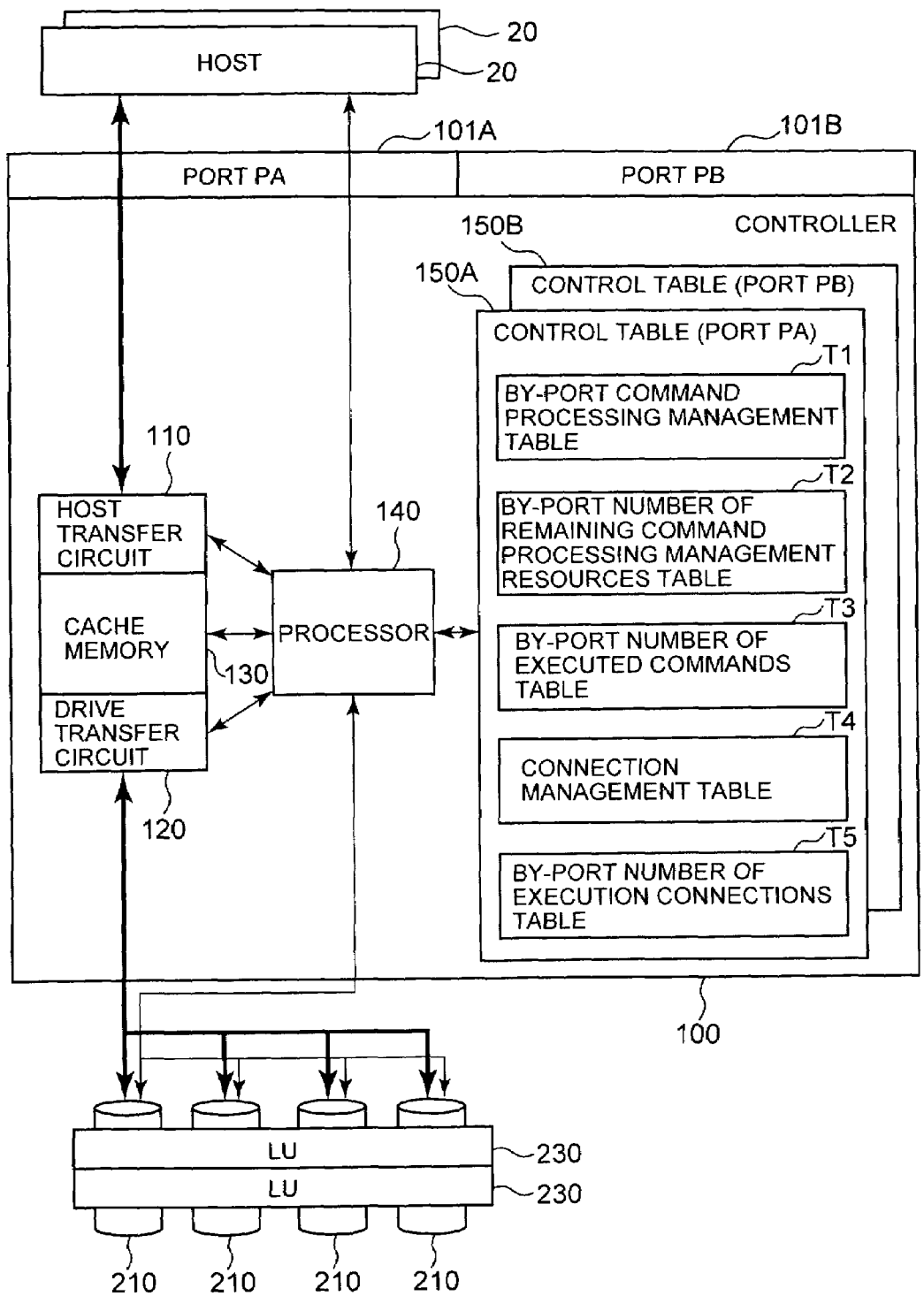
FIG. 3 is a schematic diagram showing the hardware structure of a storage control apparatus.

FIG. 3 is a schematic diagram partially showing the constitution of a storage control apparatus 10. To expedite the explanation, the constitution of one of the controllers 100 is shown in FIG. 3. The controller 100, for example, is constituted comprising a plurality of communication ports 101A, 101B, a host transfer circuit 110, a driver transfer circuit 120, a cache memory 130, a processor 140, and control tables 150A, 150B.

A host transfer circuit 110 is a circuit for carrying out communications with a host 20. The host transfer circuit 110, for example, can carry out communications independently with the respective hosts 20 based on the iSCSI protocol.

A drive transfer circuit 120 is for carrying out communications between respective storage devices 210 inside the storage part 200. The drive transfer circuit 120, for example, performs data input-output between storage devices 210 based on the FCP (Fibre Channel Protocol).

The cache memory 130 is a memory device for temporarily storing data. Data written in from a host 20 (write data) and data read out by a host 20 (read data) are stored in the cache memory 130.

For example, when a host 20 requests the controller 100 for a write-data write, the controller 100 stores write data received from the host 20 via the host transfer circuit 110 in the cache memory 130. Then, the controller 100 reports to the host 20 to the effect that write command processing is complete. Thereafter, the controller 100 writes the write data stored in the cache memory 130 to a storage device 210 by way of the drive transfer circuit 120. Furthermore, the completion of write command processing can also be reported to the host 20 after the write data has been written to a storage device 210.

When a host 20 requests the controller 100 for a data readout, the controller 100 checks whether or not the data being requested by the host 20 is stored in cache memory 130. When the data being requested by the host 20 is stored in the cache memory 130, the controller 100 reads out the data stored in cache memory 130, and sends the read-out data to the host 20 via the host transfer circuit 110. When the data being requested by the host 20 is not stored in the cache memory 130, the controller 100 reads out the data from a storage device 210 via the drive transfer circuit 120, and stores this read-out data in the cache memory 130. Then, the controller 100 sends the data stored in the cache memory 130 to the host 20 via the host transfer circuit 110.

The processor 140 comprises either one or a plurality of CPU (Central Processing Unit) cores, and controls the operations of the controller 100. The processor 140 is respectively connected to the host transfer circuit 110, the drive transfer circuit 120, the cache memory 130, a storage device 210, and the control tables 150A, 150B. The processor 140, as will be explained below, manages the amount of command processing resources allocated to the hosts 20 by port using the control tables 150A, 150B.

The control tables 150A, 150B, for example, can be provided in a memory device, such as a rewritable non-volatile memory. The control tables 150A, 150B correspond to the respective communication ports 101A, 101B. Since the control tables 150A, 150B have the same structure, hereinbelow they will be called "control table 150" except when it is necessary to distinguish between them.

The control table 150, for example, comprises a by-port command processing management table T1; a by-port number of remaining command processing management resources table T2; a by-port number of executed commands table T3; a connection management table T4; and a by-port number of execution connections table T5. Furthermore, in the embodiments to be explained hereinbelow, tables other than these T1 through T5 tables are also utilized. Next, these respective tables T1 through T5 will be explained.

Figure 4:
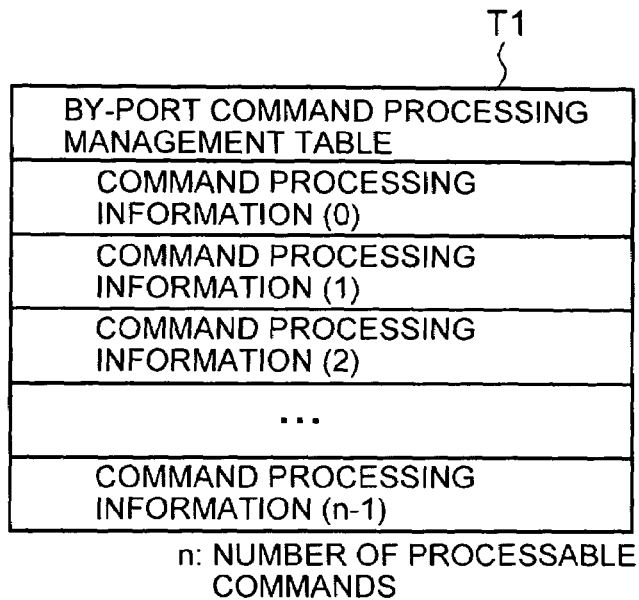
FIG. 4 is a schematic diagram showing a table for managing command processing resources by port.

FIG. 4 is a schematic diagram showing a by-port command processing management table T1. The by-port command processing management table T1 is a table for managing the command processing resources in each communication port 101A, 101B (called "ports 101" hereinbelow, except when it is necessary to distinguish between them). As shown in FIG. 4, the storage control apparatus 10 of this embodiment is capable of processing a maximum number n of commands in each port 101. The command processing information shown in FIG. 4 pertains to the command processing resources, and command processing information is set one at a time for each command received from a host 20.

Figure 5:
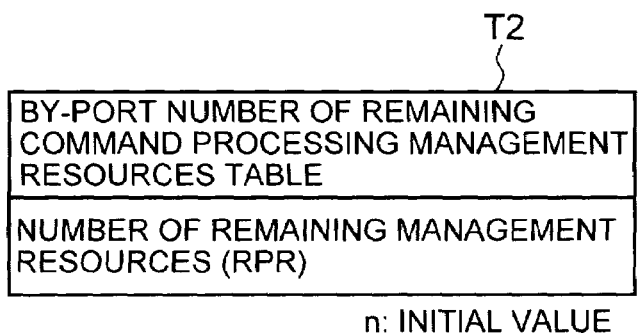
FIG. 5 is a schematic diagram showing a table for managing a remaining amount of command processing resources by port.

FIG. 5 is a schematic diagram showing a by-port number of remaining command processing management resources table T2. Hereinafter, this table is referred to as the number remaining table T2 in some cases. The number remaining table T2 is for managing the amount of remaining command processing resources (command processing information) being managed by each port 101. The remaining amount is the unused command processing resources, which have not been allocated to any hosts 20. In the figures, the remaining number (remaining amount) of command processing resources in the respective ports 101 will at times be displayed as "RPR".

Figure 6:
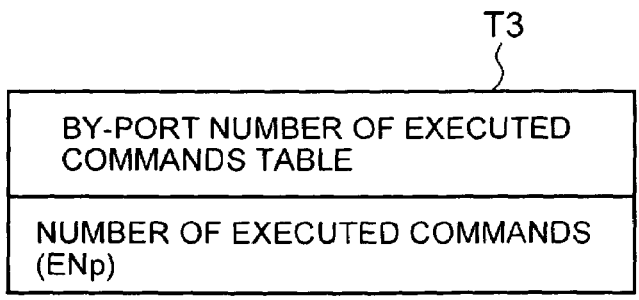
FIG. 6 is a schematic diagram showing a table for managing the number of commands being executed by port.

FIG. 6 is a schematic diagram showing a by-port number of executed commands table T3. On occasion, this table T3 will be abbreviated as number of executed commands table T3 below. The number of executed commands table T3 is for managing the number of commands being executed in each port 101, that is, the number of commands in the process of being executed. In other words, the number of executed commands table T3 manages how many commands received via the associated communication ports 101 are currently being executed. The number of commands executed by-port will be abbreviated at times as "ENp" in the figures.

FIG. 7 is a schematic diagram showing a connection management table T4. The connection management table T4 is for managing connected hosts 20 by port 101. That is, the connection management table T4 manages the hosts 20 connected to the associated communication ports 101. Therefore, the connection management table T4 can also be called the host management table.

The connection management table T4, for example, can correspondingly manage connection management information; the number of secured processing resources (AR); the number of executed commands (ENc); the number of executed commands history T41; the steady state flag; the latest CmdSN received from a host 20; the latest MaxCmdSN reported to a host 20; start time when the command execution number becomes 0; and the time period during the command execution number is 0. Furthermore, not all of these various types of information need to be provided, and portions of the information are used in the embodiments to be explained hereinbelow.

Connection management information is information for managing the connection between a host 20 and a communication port 101, and, for example, comprises an iSCSI Name.

The number of secured processing resources (AR) indicates the number of command processing resources secured for a connection allocated to a host 20. That is, the number of secured processing resources (AR) shows the number of command processing resources reserved for the use of that host 20. The number of executed commands (ENc) indicates the number of commands being executed relative to that host 20, that is, the number of commands in the process of being executed. Therefore, the number of commands executed by-port (ENp) constitutes the sum total of the number of executed commands (ENc) of the hosts 20 connected to that port 101.

The number of executed commands history T41 indicates the history of the number of commands executed relative to a host 20. The history of the number of executed commands will be explained below together with FIG. 14. The number of executed commands history T41 is used in the embodiments to be explained below.

The steady state flag is information showing the status of the number of executed commands (ENc) relative to a host 20. That is, the steady state flag is information showing the command issuing status of a host 20. When it is determined that a host 20 is in a steady state, "1" is set in the steady state flag. When it is determined that a host 20 is not in a steady state, "0" is set in the steady state flag. A steady state indicates a state wherein the value of the number of executed commands (ENc) executed for a host 20 is stable. As a state other than a steady state, there is a decreasing state. A decreasing state indicates a state wherein the value of the number of executed commands (ENc) executed for a host 20 has decreased from the steady state. The steady state flag is used in the embodiments to be explained hereinbelow together with the number of executed commands history T41.

A received CmdSN, as explained hereinabove, is a serial number to which is added the latest command received from a host 20. The reported MaxCmdSN, as explained hereinabove, shows the MaxCmdSN notified to a host 20 from the storage control apparatus 10. The MaxCmdSN is information showing the remaining number of commands capable of being issued.

Executed-number-0 start time, as described hereinabove, shows the initial time at which the number of commands (ENc) executed relative to a host 20 reached 0. The executed-number-0 time period shows the period of time during which the number of executed commands (ENc) of a host 20 reached 0. This executed-number-0 start time and executed-number-0 time period information is used in another embodiment to be explained hereinbelow.

FIG. 8 is a schematic diagram showing a by-port number of execution connections table T5. This table T5 is for managing the number of connections (EC) being executed by a communication port 101. That is, this table T5 manages, by each /port 101, the number of command-issuing hosts 20, which are connected to a communication port 101. There will be times below when this table T5 is called the number of execution connections table T5.

Next, the operation of a storage control apparatus 10 according to this embodiment will be explained while referring to a flowchart. The flowcharts show an overview of the processing, and there will be instances when this processing will differ with an actual program. Furthermore, the term step will be abbreviated as "S".

FIG. 9 is a flowchart showing a command receiving process. This process is executed by the storage control apparatus 10. The storage control apparatus 10 determines whether or not a command has been received from a host 20 (S11).

When it determines that a command has been received (S11: YES), the storage control apparatus 10 increments the number of commands executed by port (ENp) by 1 for the communication port 101 that received this command (S12). In addition, the storage control apparatus 10 increments by 1 the number of executed commands (ENc) of the connection related to this received command (S13). In other words, it adds one to the number of executed commands (ENc) for the host 20 that issued this command.

The storage control apparatus 10 determines whether or not this is the first command received relative to this connection (host 20) (S14). That is, a determination is made as to whether or not the command is the first one issued from this host 20. When it is the first command issued from this host 20 (S14: YES), the storage control apparatus 10 increments by 1 the execution connection number (EC) for the communication port 101, which received this first command (S15).

The storage control apparatus 10 stores the CmdSN to which the command received in S11 was added (S16). The storage control apparatus 10 determines whether or not the by-port command processing management table T1 is full (S17). That is, it makes a determination as to whether or not the command processing resources required to process the command received in S11 exist.

When there are command processing resources (S17: NO), the storage control apparatus 10 processes the command received in S11 (S18). If this command is a write command, the storage control apparatus 10 writes the write date received from the host 20 to a storage device 210. If this command is a read command, the storage control apparatus 10 reads out the requested data from either the cache memory 130 or a storage device 210.

By contrast, when there are no command processing resources for processing the command received in S11 (S17: YES), it is not possible to process this command. Accordingly, the storage control apparatus 10 makes a transmission to the host 20 to the effect that it is a QueueFull state (S19). When the storage control apparatus 10 confirms that it is a QueueFull state, the host 20, for example, will issue the command once again after waiting for a prescribed period of time to elapse.

Figure 10:
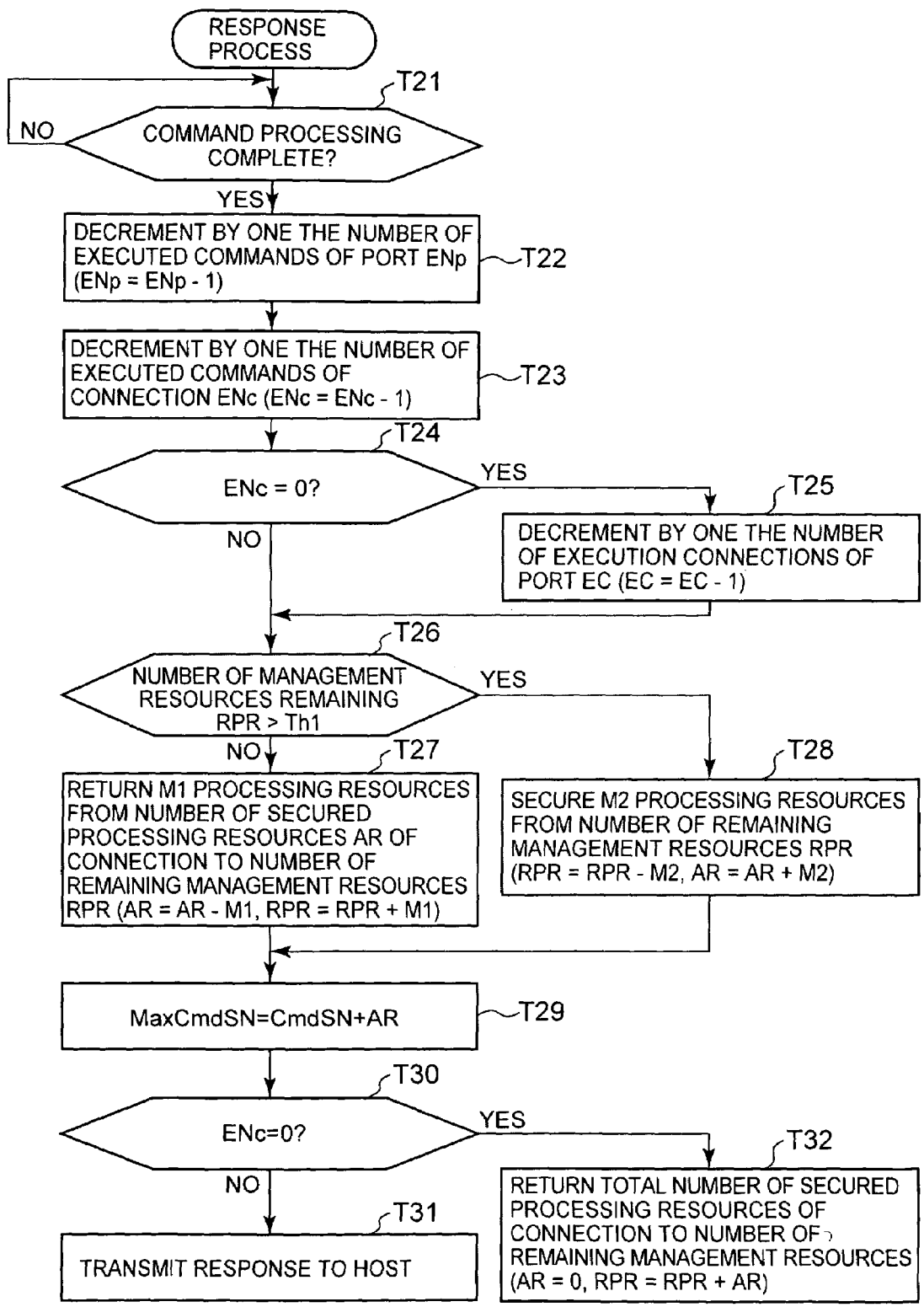
FIG. 10 is a flowchart showing the process when a response is issued from a storage control apparatus to a host.

FIG. 10 is a flowchart showing the process for returning a response to a host 20 from the storage control apparatus 10. As will be discussed below, when the storage control apparatus 10 notifies (responds to) a host 20 of the processing results of a command that was received from the host 20, it makes the notification by adjusting the number of commands this host 20 is allowed to issue. The number of commands that a host 20 is allowed to issue (a number showing how many command can be issued thereafter) is notified in accordance with a MaxCmdSN sent from the storage control apparatus 10 to the host 20.

The storage control apparatus 10 determines whether or not the processing of the command received in S11 is complete (S21), and when the processing of the command is complete (S21: YES), it decrements by 1 the number of commands executed by port ENp of the communication port 101, which received this command (S22). Subsequent to this, the storage control apparatus 10 decrements by 1 the number of executed commands ENc of that connection (host 20) (S23).

The storage control apparatus 10 determines whether or not the number of executed commands ENc of that connection has reached 0 (S24). When it determines that ENc=0 (S24: YES), the processing of all the commands received via that connection is over, and there are no unprocessed commands left. In other words, since it is a state, wherein the host 20 for which ENc=0 is not issuing commands, the storage control apparatus 10 decrements by 1 the execution connection number EC of the communication port 101. This is because the execution connection number EC is information for managing a host 20, which is executing a command (command-executing host 20).

When the executing command number ENc of the connection is not 0 (S24: NO), the storage control apparatus 10 calculates a MaxCmdSN to be notified to the host 20 as follows. First, the storage control apparatus 10 determines, by virtue of referencing a table T2, whether or not the remaining number of command processing resources RPR (pooled command processing resources) of the communication port 101 associated to this connection exceeds a threshold value Th1 (S26). In other words, the storage control apparatus 10 determines whether or not there is a threshold value Th1 or greater surplus of unused command processing resources associatively pooled in this communication port 101.

When the remaining number RPR is less than the threshold value Th1 (S26: NO), the storage control apparatus 10 returns M1 command processing resources from the number of secured processing resources (AR) of the connection to the remaining number RPR (S27). In other words, when the remaining number RPR of resources shared by port (resource pool) is less than Th1, the storage control apparatus 10 returns to the shared resources M1 number of command processing resources, of the command processing resources allocated to this connection (AR=AR−M1, RPR=RPR+M1). Accordingly, the amount of command processing resources capable of being freely used in this communication port 101 increases. Therefore, for example, either the amount of command processing resources allocated to other hosts 20 can be increased, or command processing resources can be added to a new host 20.

When the remaining number RPR exceeds the threshold value Th1 (S26: YES), the storage control apparatus 10 newly acquires M2 number of command processing resources from the remaining number RPR, and increments the number of command processing resources (AR) allocated to the connection (S28). In other words, the storage control apparatus 10 does not allow the unused command processing resources pooled by communication port 101 to lie idle, and distributes as many command processing resources as possible to command-executing hosts 20 (RPR=RPR−M2, AR=AR+M2).

The storage control apparatus 10, as described in S26, S27, and S28, updates the number of command processing resources allocated to a connection (number of secured processing resources) AR based on the results of comparing the remaining number RPR against the threshold value Th1. Then, the storage control apparatus 10 calculates the MaxCmdSN by adding this updated AR to the CmdSN (S29).

Then, the storage control apparatus 10 once again determines whether or not the number of executed commands ENc of this connection is 0 (S30). When it determines that ENc is not 0 (S30: NO), it returns a response to the host 20 (S31). The response transmitted from the storage control apparatus 10 to the host 20 comprises the processing results of the command processed in S18 of FIG. 9, and the MaxCmdSN calculated in S29.

As already discussed, the MaxCmdSN shows the number of processable commands received from a host 20. That is, the MaxCmdSN shows the remaining number of commands that a host 20 can issue. A host 20 can issue new commands until the CmdSN reaches the MaxCmdSN.

When the number of commands being executed Enc relative to a host 20 becomes 0 prior to a response being made to the host 20 (S30: YES), the storage control apparatus 10 returns to the shared port resources all the command processing resources allocated to this host 20 (S32). This is because a host 20 for which ENc=0 is finished issuing commands, and there is no need to allocate command processing resources.

Figure 11:
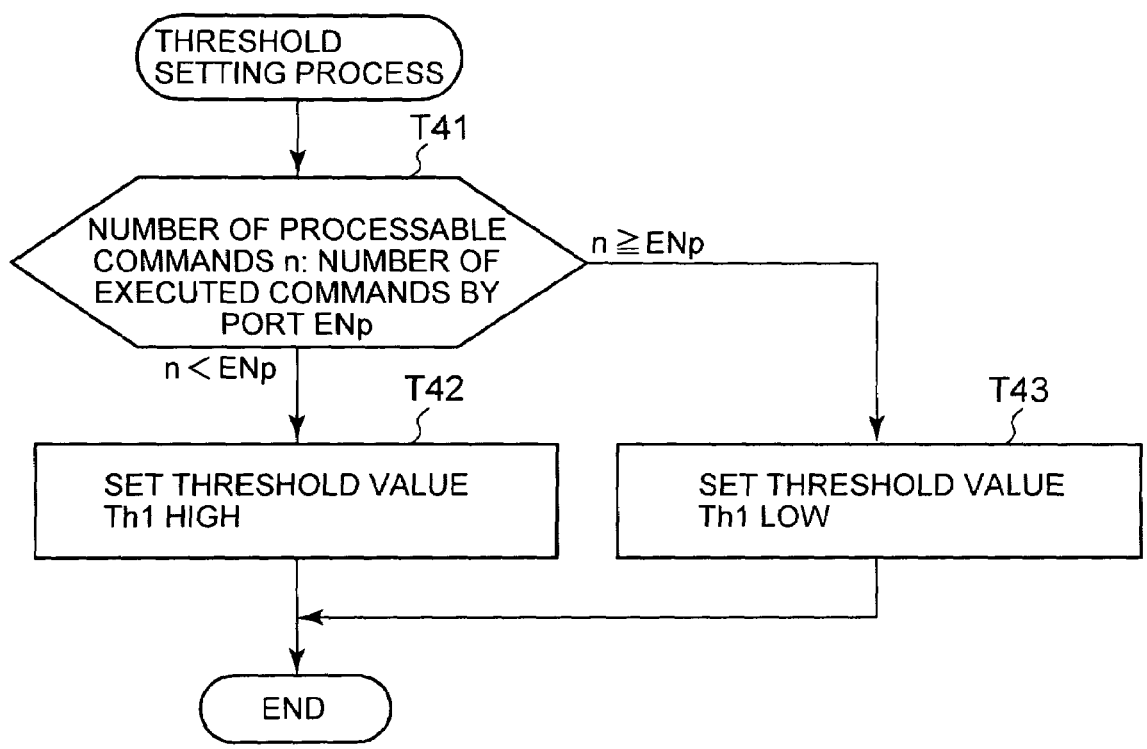
FIG. 11 is a flowchart showing the process for setting a threshold value for controlling the amount of command processing resources allocated.

FIG. 11 is a flowchart showing the process for setting the threshold value Th1 used in S26 in FIG. 10. This process is executed for each communication port 101. The storage control apparatus 10 compares the processable number of commands n against the number of commands executed by port ENp of a communication port 101 (S41). The processable number of commands n indicates the total number of commands capable of being processed relative to a communication port 101. That is, the processable number of commands n is the total amount of command processing resources being managed by this communication port 101.

When the number of commands being executed relative to a communication port 101 ENp exceeds the processable number of commands n (n<ENp), the storage control apparatus 10 increases the threshold value Th1 (S42). For example, when n is either 512 or 1024, the storage control apparatus 10 can set the threshold value Th1 to 64.

By contrast to this, when the processable number of commands n is greater than number of commands being executed relative to a communication port 101 ENp (n≧ENp), the storage control apparatus 10 decreases the threshold value Th1 (S43). For example, the storage control apparatus 10 sets the threshold value Th1 to 0.

In other words, in this embodiment, the initial value of the threshold value Th1 is set to 0. Then, when the total number of commands ENp being executed relative to a communication port 101 exceeds the total number of command processing resources allocated to this communication port 101, the storage control apparatus 10 sets the threshold value Th1 higher (S41). Accordingly, as discussed in FIG. 10, the likelihood of the remaining number RPR being less than the Th1 increases (S26: NO), increasing the number of command processing resources being managed in each communication port 101 as pooled resources. As a result of this, the value of the MaxCmdSN calculated in S29 of FIG. 10 decreases, reducing the number of commands that a host 20 is allowed to issue.

By contrast, when the number of executed commands ENc is less than the processable number of commands n, the threshold value Th1 returns to 0, and more command processing resources are allocated to a host 20. Accordingly, the number of commands that a host 20 is allowed to issue increases, enabling the host 20 to issue more multiple commands.

Automatically changing the threshold value Th1 as described above is done for the following reason. In this embodiment, when the number of executed commands ENc of the one host 20 becomes 0, all of the command processing resources allocated to the one host 20 are returned to the remaining number of processing resources RPR (S32). Then, the command processing resources returned to the resources pooled by port are allocated to the other host 20 (S27).

Therefore, the total value of the number of commands that the one host 20 is allowed to issue, and the number of commands that the other host 20 is allowed to issue will exceed the total number of commands n capable of being processed relative to this communication port 101. In a state in which the total number of commands capable of being issued exceeds the total processable number n, the issuing of commands by the one host 20 and the other host 20, respectively, runs the risk of generating a QueueFull state.

Accordingly, in the present embodiment, as was explained together with FIG. 11, adjusting the value of the threshold value Th1 in accordance with increases and decreases in the remaining number of command processing resources RPR automatically cancels the state in which the total number of commands allowed to be issued exceeds the number of commands capable of being processed. That is, a state, in which the number of commands allowed to be issued exceeds the number actually capable of being processed n (excess state), can be canceled prior to commands in excess of the allowable number being issued from the hosts 20.

Figure 12:
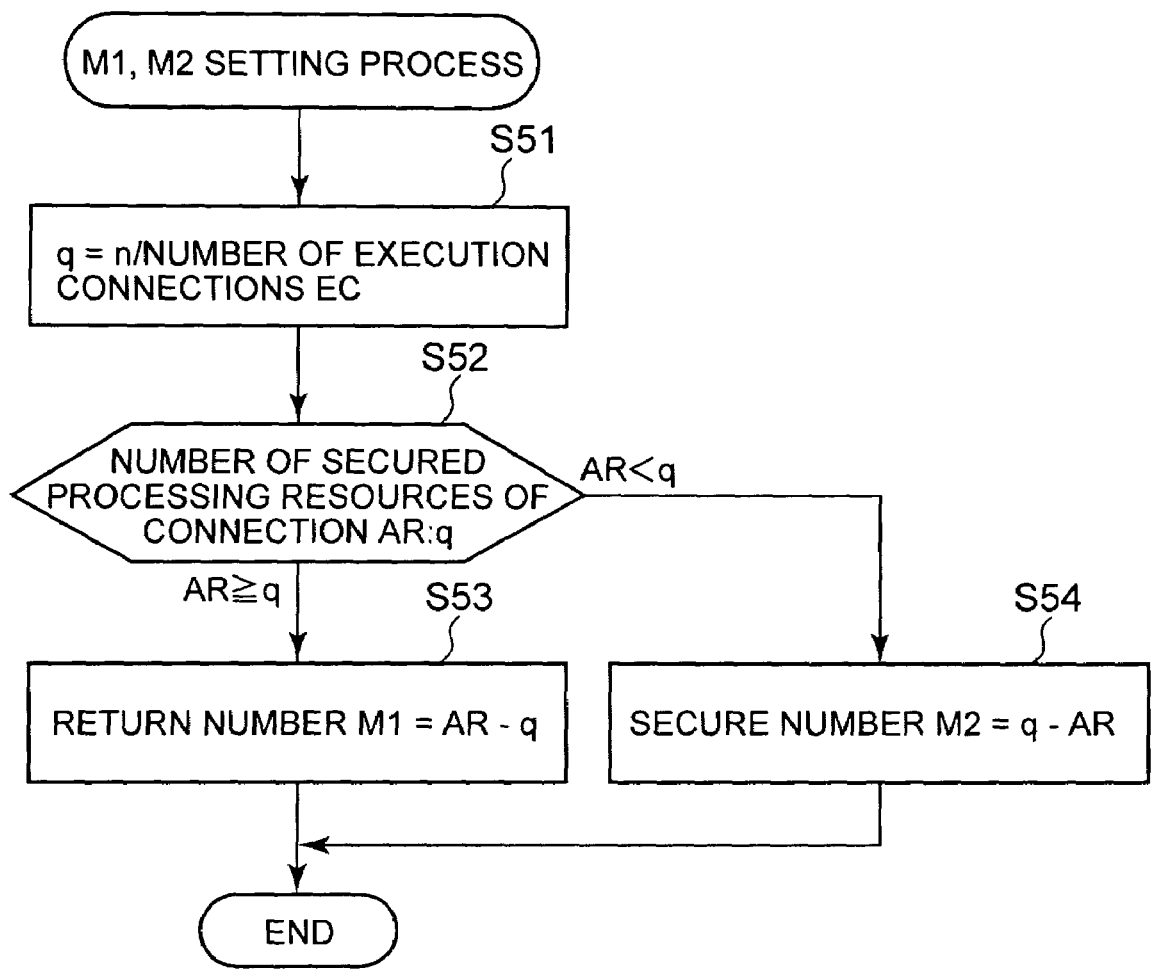
FIG. 12 is a flowchart showing processes for respectively setting a secured number when adding command processing resources to hosts, and the return number when returning command processing resources already allocated to hosts.

FIG. 12 shows the process for setting the values of M1 and M2, which are used in S27 and S28 in FIG. 10. This process is also executed for each communication port 101. Here, because M1 is the number reflecting the reduction and returning to the resource pool (RPR) of command processing resources allocated to a host 20, it can be called either the resource reduction number or the return number. M2 is the number of additional command processing resources allocated to a host 20, and as such, can be called either the resource addition number or the secured number.

Refer to FIG. 12. The storage control apparatus 10 calculates the reference value q of the command processing resources to be allocated to the respective hosts 20 connected to a communication port 101 (S51). This allocation reference value q, for example, is determined by dividing the total amount of command processing resources associated to this communication port 101 (number of commands capable of being processed n) by the number of hosts 20 issuing commands (number of execution connections EC) (q=n/EC). That is, the storage control apparatus 10 divides the total amount of command processing resources (n) by the actual number of command-issuing hosts 20 (EC) of all the hosts 20 connected to this communication port 101, and calculates a reference value q.

The storage control apparatus 10 compares the number of command processing resources allocated to a host 20 AR against the calculated reference value q (S52). When the number of command processing resources already allocated AR is greater than the reference value q, the storage control apparatus 10 calculates the return number M1 by subtracting the reference value q from the AR (S53). In accordance with this, M1 (M1=AR−q) number of command processing resources are removed from the host 20 to which command processing resources in excess of the reference value q have been allocated, and returned to the resource pool (RPR) (S 27 of FIG. 10).

By contrast, when the number of allocated command processing resources AR is smaller than the reference value q, the storage control apparatus 10 calculates the secured number M2 by subtracting AR from the reference value q (S54). Thus, M2 (M2=q−AR) number of command processing resources are added and allocated to the host 20 for which the allocated command processing resources are less than the reference value q (S28 of FIG. 10).

As described together with FIG. 12, in this embodiment, the amount by which the command processing resources allocated to a host 20 increases or decreases M1, M2, is automatically adjusted on the basis of a reference value q. The reason for this is as follows. That is, when the number of times, which a command processing resource allocated to a host 20 is returned to the resource pool (RPR), increases, this returned command processing resource is allocated to another host 20, raising the likelihood of the above-mentioned excess state. Accordingly, in this embodiment, the number of command processing resources allocated to the hosts 20 is adjusted on the basis of the reference value q. This makes it possible to suppress a situation in which command processing resources allocated to a host 20 are returned to the resource pool more than needed, enabling the generation of the above-mentioned excess state to be held in check.

The constituting of this embodiment as described above achieves the following effects. In this embodiment, the storage control apparatus 10 respectively manages command processing resources by communication port 101, allocates command processing resources to the respective hosts 20, and uses the MaxCmdSN to notify the hosts 20 of the number of command processing resources capable of being received. Therefore, the hosts 20 can issue commands based on the receivable number notified from the storage control apparatus 10, and the storage control apparatus 10 can control the number of commands issued from the hosts 20. This can reduce the likelihood of the storage control apparatus 10 entering the QueueFull state, and prevent the performance of the storage control apparatus 10 from deteriorating, making it possible to heighten the reliability of the storage control apparatus 10.

In this embodiment, the number of commands issued from the hosts 20 is controlled by appropriately setting the value of the MaxCmdSN. Therefore, when the constitution of a host 20 already connected to the storage control apparatus 10 changes, or a new host 20 is connected to the storage control apparatus 10, it is not necessary to change the number of multiple commands of the hosts 20. Therefore, a host 20 can be added, or its constitution can be changed online as-is without having to shut down the host 20, making for enhanced usability.

In this embodiment, a threshold value Th1 for determining if an additional command processing resources will be allocated to a host 20, or if the command processing resources allocated to a host 20 will be reduced, is set based on the total amount of command processing resources n associated to a communication port 101, and the number of commands being executed ENp relative to this communication port 101. Thus, it is possible to curb the occurrence of a situation in which the total value of the number of commands the respective hosts 20 are allowed to issue exceeds the actual number of commands capable of being processed n, and to check the occurrence of a QueueFull state.

In this embodiment, a reference value q is calculated by dividing the total amount n of command processing resources associated to a communication port 101 by the number of hosts 20 issuing commands to this communication port 101, and amount of command processing resources allocated to the hosts 20 is adjusted on the basis of this reference value q. Accordingly, the more than necessary allocation of command processing resources to a host 20, and the more than needed returning to the resource pool of command processing resources allocated to a host 20 can be held in check. This makes it possible to curb the occurrence of the above-mentioned excess state, and to enhance reliability.

Second Embodiment

A second embodiment will be explained based on FIGS. 13 through 15. The following embodiments, to include this embodiment, correspond to variations of the above-described first embodiment. In this embodiment, the end phase of command issuing is predicted based on the number of executed commands ENc, which were issued from a host 20, and the command processing resources allocated to this host 20 are returned to the resource pool (RPR) at the beginning phase.

This embodiment, for example, can be applied when the distance between a host 20 and the storage control apparatus 10 is relatively close, and the communication delay time is minimal. FIG. 13 is a diagram schematically showing the relationship between the state of a command issued from a host 20 (initiator) to the storage control apparatus 10 (target), and the number of commands ENc received from this host to be executed inside the storage control apparatus 10.

Figure 13:
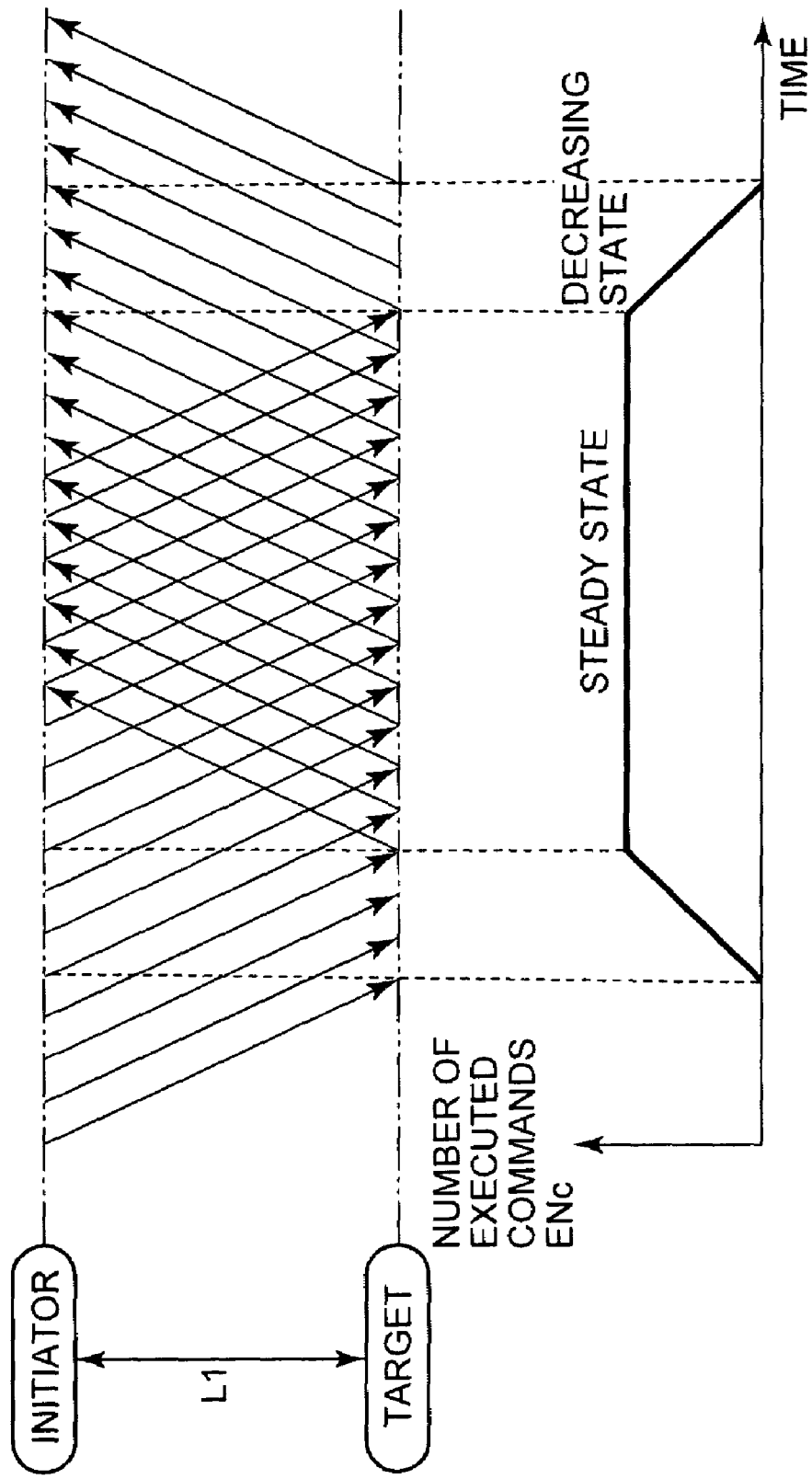
FIG. 13 is a schematic diagram showing a state wherein a storage control apparatus related to a second embodiment receives and executes a command from a host.

As shown in FIG. 13, a host 20 can consecutively issue a plurality of commands without waiting for a response from the storage control apparatus 10. The storage control apparatus 10 processes the commands received from the host 20, and responds by adding a MaxCmdSN to the results of this processing. Therefore, a little time lag occurs between the time the host 20 issues a command, and the time the storage control apparatus 10 responds.

As shown at the bottom of FIG. 13, the number of commands executed ENc inside the storage control apparatus 10 relative to this host 20 increases each time a command is received for the host 20. Then, when the processing of the command received previously is complete, and the results of this processing are returned to the host 20, the number of executed commands ENc decreases by this much. Therefore, when the host 20 issues multiple commands at an approximately fixed frequency, and the storage control apparatus 10 processes the commands at an approximately fixed speed, the value of the number of executed commands ENc becomes approximately constant from a certain time onward. The time period when this number of executed commands ENc becomes approximately constant is called the steady state of the number of executed commands ENc in this specification.

When the data processing of a host 20 comes to a pause, and the issuing of commands is interrupted, command processing continues inside the storage control apparatus 10, with the result that the value of the number of executed commands ENc decreases slightly. In this specification, the state, wherein the number of executed commands ENc decreases from the steady state is called the decreasing state.

Figure 14:
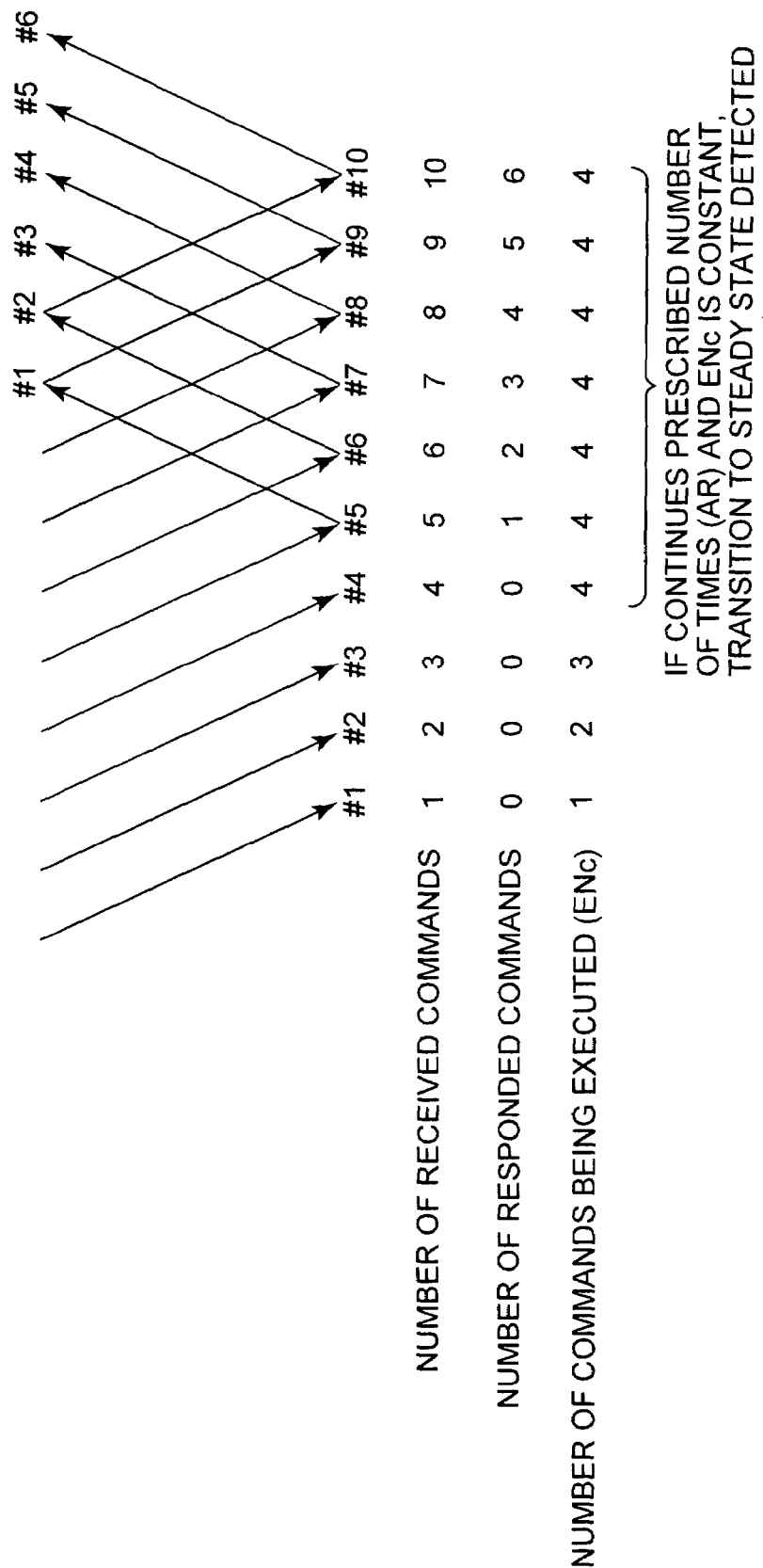
FIG. 14 is a schematic diagram showing a change in the number of commands being executed by a storage control apparatus.

FIG. 14 is a diagram schematically showing the change in the number of executed commands ENc. When a first command (#1) is received from a host 20, the number of received commands of the storage control apparatus 10 is "1". Since the processing of this first command is not complete, the number of responded commands is "0". Therefore, at the point in time at which the storage control apparatus 10 received the first command, the number of executed commands ENc constituted 1 (ENc=number of received commands−number of responded commands).

If it is supposed that the storage control apparatus 10 received the first through the fourth (#4) commands during the period up until the processing results of the first command were notified to the host 20, the number of executed commands ENc will steadily increase from "1"→"2"→"3"→"4". This state can also be called the increasing state.

When the processing of the initially received commands (#1 and so forth) is complete, and the time for making a notification to the host 20 arrives, the value of the number of executed commands ENc is stable at "4" in the example shown in the figure. When the value of the number of commands being executed ENc continues more than a prescribed number of times, showing the same value ("4" in this example), the storage control apparatus 10 can determine that processing has transitioned from the increasing state to the steady state.

Similarly, when the value of the number of executed commands ENc begins to decrease from the value of the steady state, the storage control apparatus 10 can detect the transition from the steady state to the decreasing state.

Figure 15:
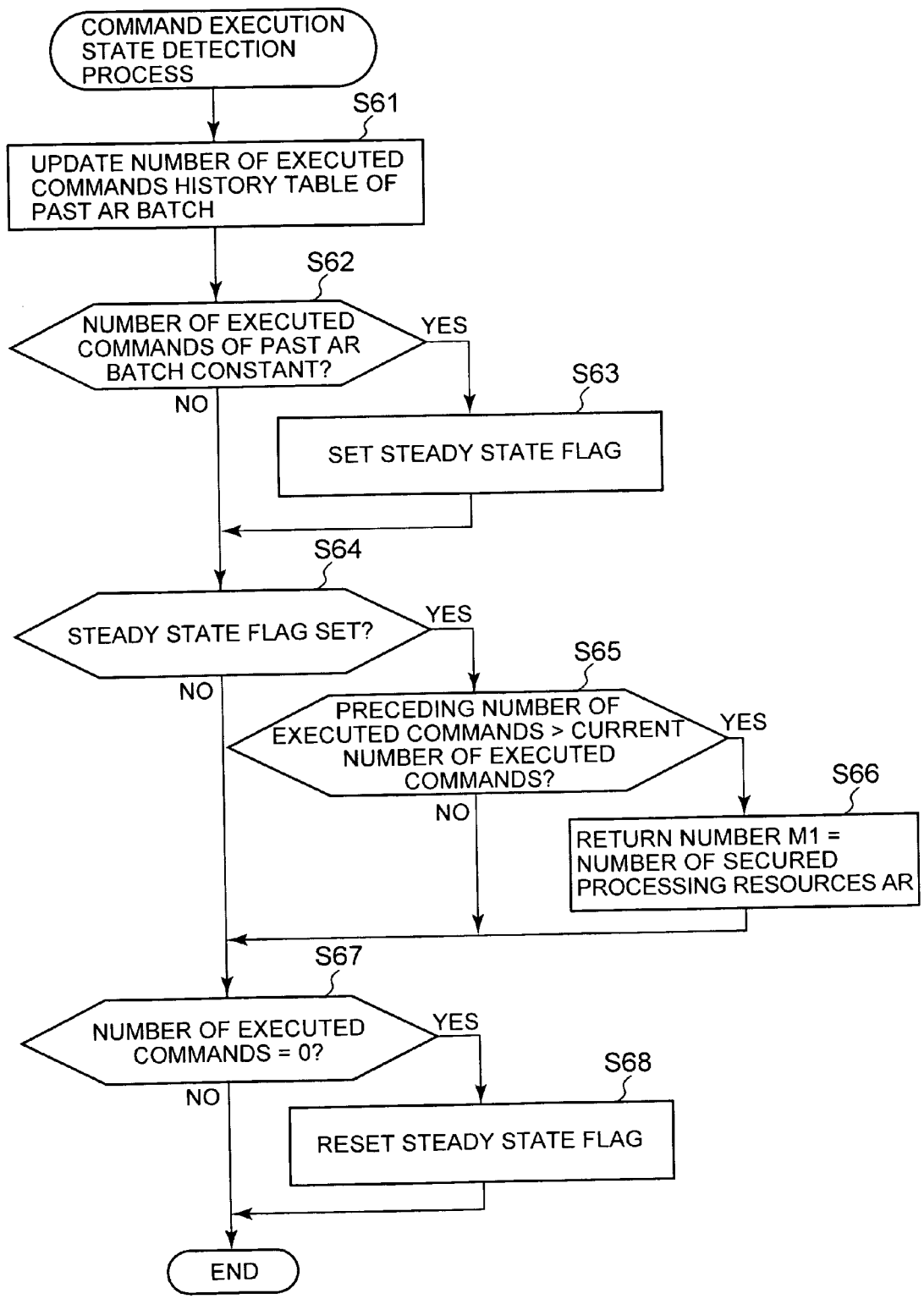
FIG. 15 is a flowchart showing a process for predicting a change in the number of commands being issued from a host.

FIG. 15 shows the processing for detecting the state of commands being issued from a host 20 (the end phase of command issuing), and returning command processing resources to the resource pool (RPR). This flowchart is executed by the storage control apparatus 10 for each communication port 101.

First, the storage control apparatus 10 updates the number of executed commands history table T41 by the past AR batch (S61), and determines whether or not the number of executed commands ENc of the past AR batch is approximately constant (S62). As described hereinabove, AR is the number of command processing resources allocated to a host 20.

When the number of executed commands ENc is approximately constant (S62: YES), the storage control apparatus 10 determines that it has transitioned to the steady state, sets the steady state flag of table T4 shown in FIG. 7 (S63), and moves to S64. When the number of executed commands ENc is not approximately constant (S62: NO), the storage control apparatus 10 proceeds to S64.

The storage control apparatus 10 determines whether or not the steady state flag is set (S64), and when the steady state flag is set (S64: YES), it determines whether or not the number of executed commands ENc of this time is smaller than the number of executed commands ENc of the previous time (S65).

When the number of executed commands ENc of this time is smaller than the number of executed commands ENc of the previous time (S65: YES), the storage control apparatus 10 determines that it has transitioned from the steady state to the decreasing state. Accordingly, the storage control apparatus 10 returns all the command processing resources allocated to this host 20 as a resource pool (S66). That is, when the storage control apparatus 10 detects the transition from the steady state to the decreasing state, it predicts that the end of the issuing of commands by this host 20 is near, and returns all the command processing resources (AR) allocated to this host 20 to the resource pool (RPR) (M1=AR). Then, the storage control apparatus 10 proceeds to S67.

When the steady state flag is not set (S64: NO), the storage control apparatus 10 proceeds to S67. Further, when the number of executed commands ENc of this time is no different than the number of executed commands ENc of the previous time (S65: NO) the storage control apparatus 10 proceeds to S67.

Then, the storage control apparatus 10 determines whether or not the number of executed commands ENc is 0 (S67). When the number of executed commands ENc is 0 (S67: YES), the storage control apparatus 10 determines that this host 20 is finished issuing commands, and resets the steady state flag (S68).

This embodiment, which is constituted as described above, also achieves the same operational effects as the above-mentioned first embodiment. In addition to this, in this embodiment, the end of the issuing of commands by a host 20 is predicted based on the status of the number of executed commands ENc, and the command processing resources allocated to this host 20 are returned to the resource pool prior to the number of executed commands ENc becoming 0. Therefore, command processing resources can be allocated to the other host 20, making it possible to effectively use the command processing resources being managed by communication port 101.

Third Embodiment

A third embodiment will be explained based on FIGS. 16 through 18. In this embodiment, when the arrival of a command from a host 20 is delayed, the command processing resources allocated to this host 20 are maintained without returning them to the resource pool, until either the preceding executed-number-0 time period T0, or a prescribed time RT has elapsed.

That is, in this embodiment, the command processing resources allocated to a host 20 are maintained as-is without returning them to the resource pool until a response time, which has actually been measured (preceding executed-number-0 time period T0), has elapsed. Conversely, when the command processing resources continue to be maintained for a long period of time, there is likely to be a shortage of command processing resources inside the resource pool. Accordingly, the constitution is such that when a prescribed time RT has elapsed, the command processing resources allocated to a host 20 are returned to the resource pool.

Figure 16:
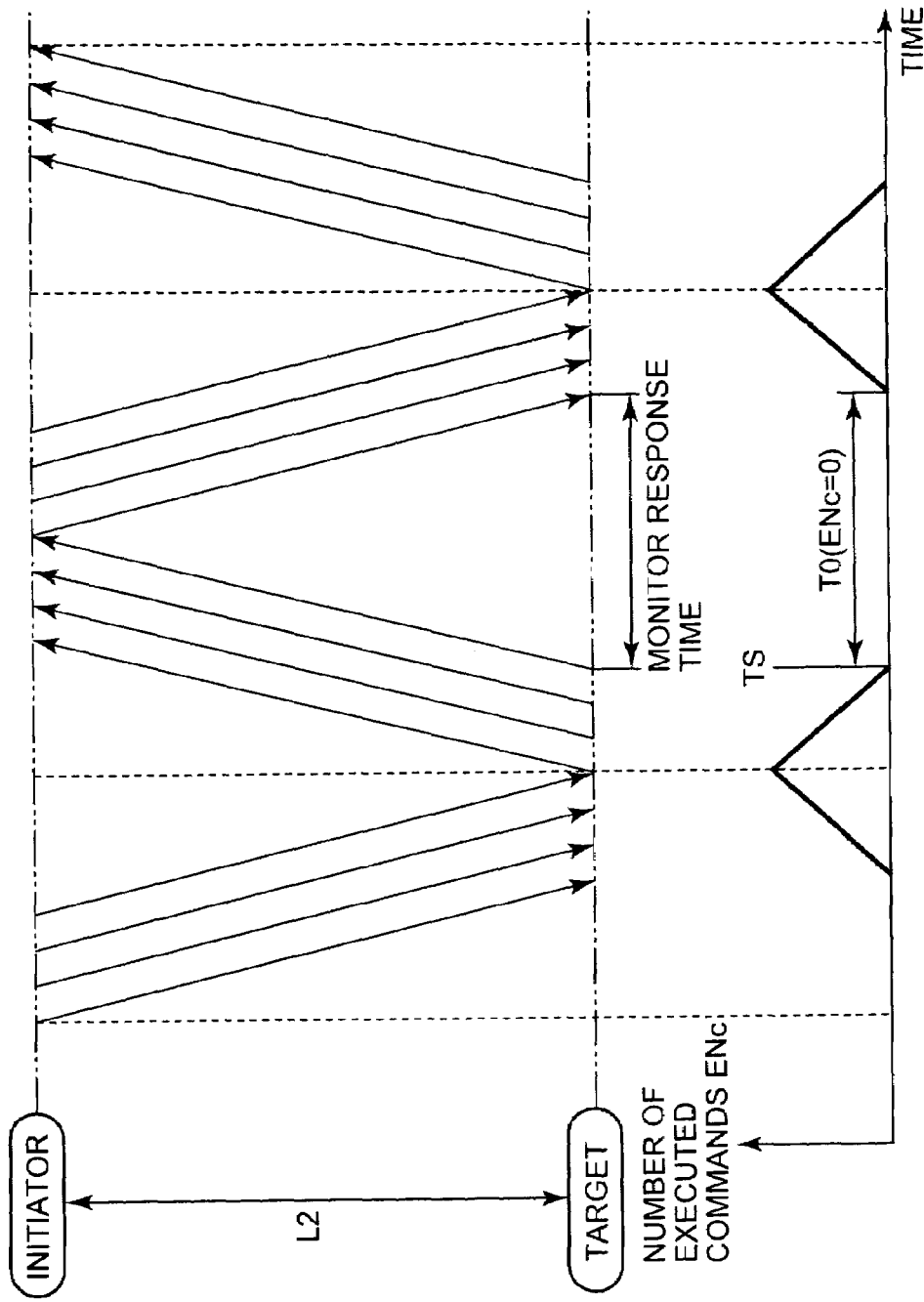
FIG. 16 is a schematic diagram showing a state wherein a storage control apparatus related to a third embodiment receives and executes a command from a host.

As shown in FIG. 16, this embodiment, for example, is utilized when the distance L2 separating a host 20 and the storage control apparatus 10 is relatively long, and a communication delay time exists between the two. A command issued from a host 20 will arrive later than when a host 20 and the storage control apparatus 10 are in close proximity due to the physical distance between the host 20 and the storage control apparatus 10, and the response delay inside a switch 30.

Therefore, even when a host 20 issues multiple commands, there occurs a time TS on the storage control apparatus 10 side when the number of executed commands ENc becomes 0 because of the time it takes to transfer a command. The period of time when the number of executed commands ENc constitutes 0 continues until the next command from the host 20 reaches the storage control apparatus 10. In this specification, the period when this number of executed commands ENc is 0 will be called the executed-number-0 time period T0.

Figure 17:
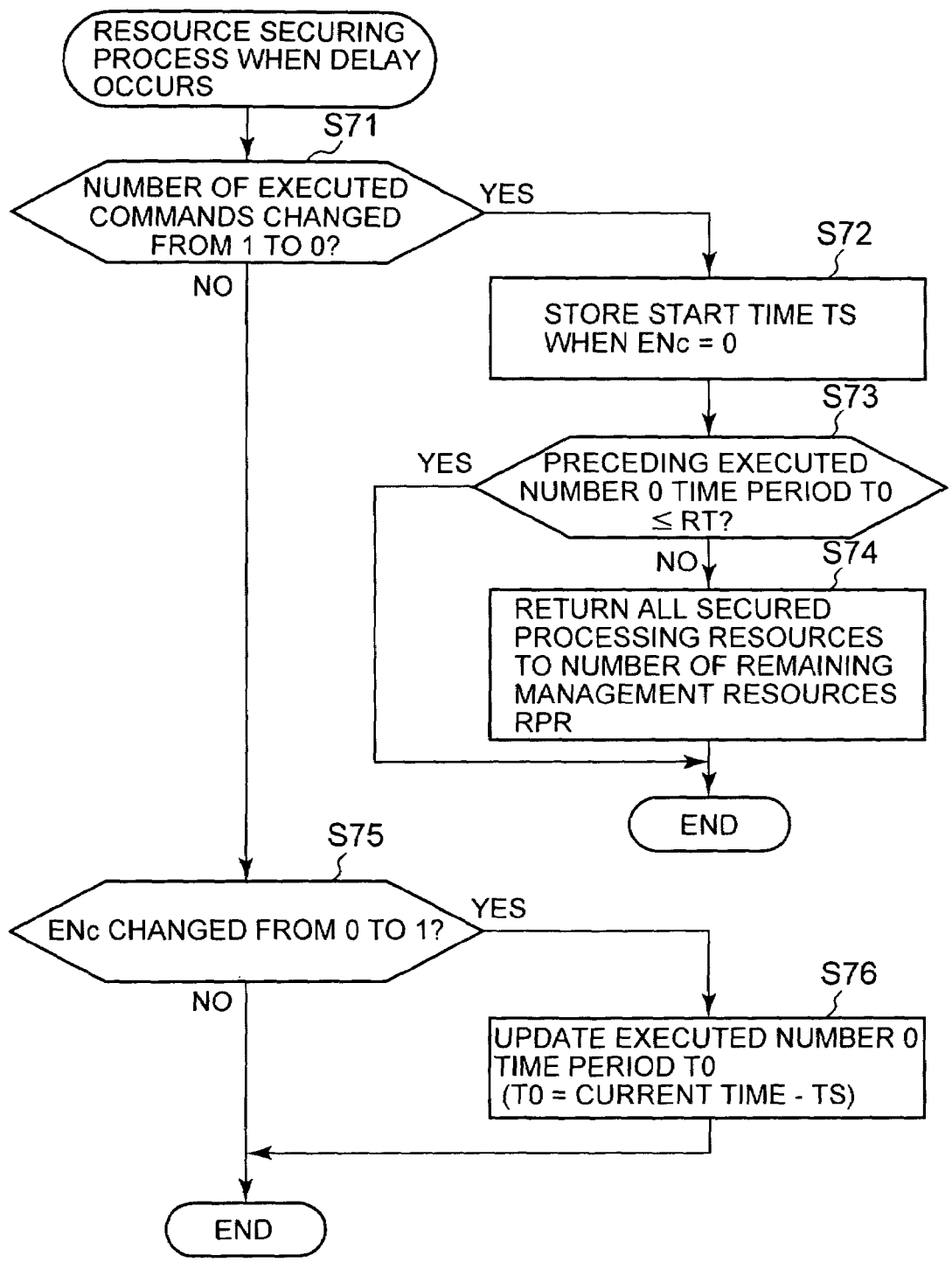
FIG. 17 is a flowchart showing a process for maintaining already allocated command processing resources until a prescribed period of time has elapsed even when a command from a host is temporarily interrupted.

FIG. 17 is a flowchart showing the process for continuing to secure command processing resources when there is communication delay time between a host 20 and the storage control apparatus 10. First of all, the storage control apparatus 10 determines whether or not the number of executed commands ENc changed from "1" to "0" (S71).

When the number of executed commands ENc changed from "1" to "0" (S71: YES), the storage control apparatus 10 stores the time at which ENc=0 as the start time TS of the executed-number-0 time period T0 (S72). Next, the storage control apparatus 10 compares the time period T0, which was measured the preceding time in S76 to be explained hereinbelow, against a prescribed time RT (S73). That is, the storage control apparatus 10 determines whether or not the preceding time period T0 is within a prescribed time RT (S73). When the preceding time period T0 during which the number of executed commands ENc was 0 is less than the prescribed time RT (S73: YES), the storage control apparatus 10 terminates processing without doing anything. By contrast, when the preceding time period T0 has attained the prescribed time RT (S73: NO), the storage control apparatus 10 returns all the command processing resources allocated to the host 20 for which ENc=0 to the resource pool (RPR) (S74).

When the number of executed commands ENc has not changed from "1" to "0" (S71: NO), the storage control apparatus 10 determines whether or not the number of executed commands ENc has changed from "0" to "1" (S75). The changing of the ENc from "0" to "1" occurs when the executed-number-0 time period T0 has ended. Accordingly, the storage control apparatus 10 updates the value of the time period T0 in table T4 (S76). That is, the storage control apparatus 10 calculates the latest time period T0 by subtracting the start time TS from the current time, and registers it in table T4.

Figure 18:
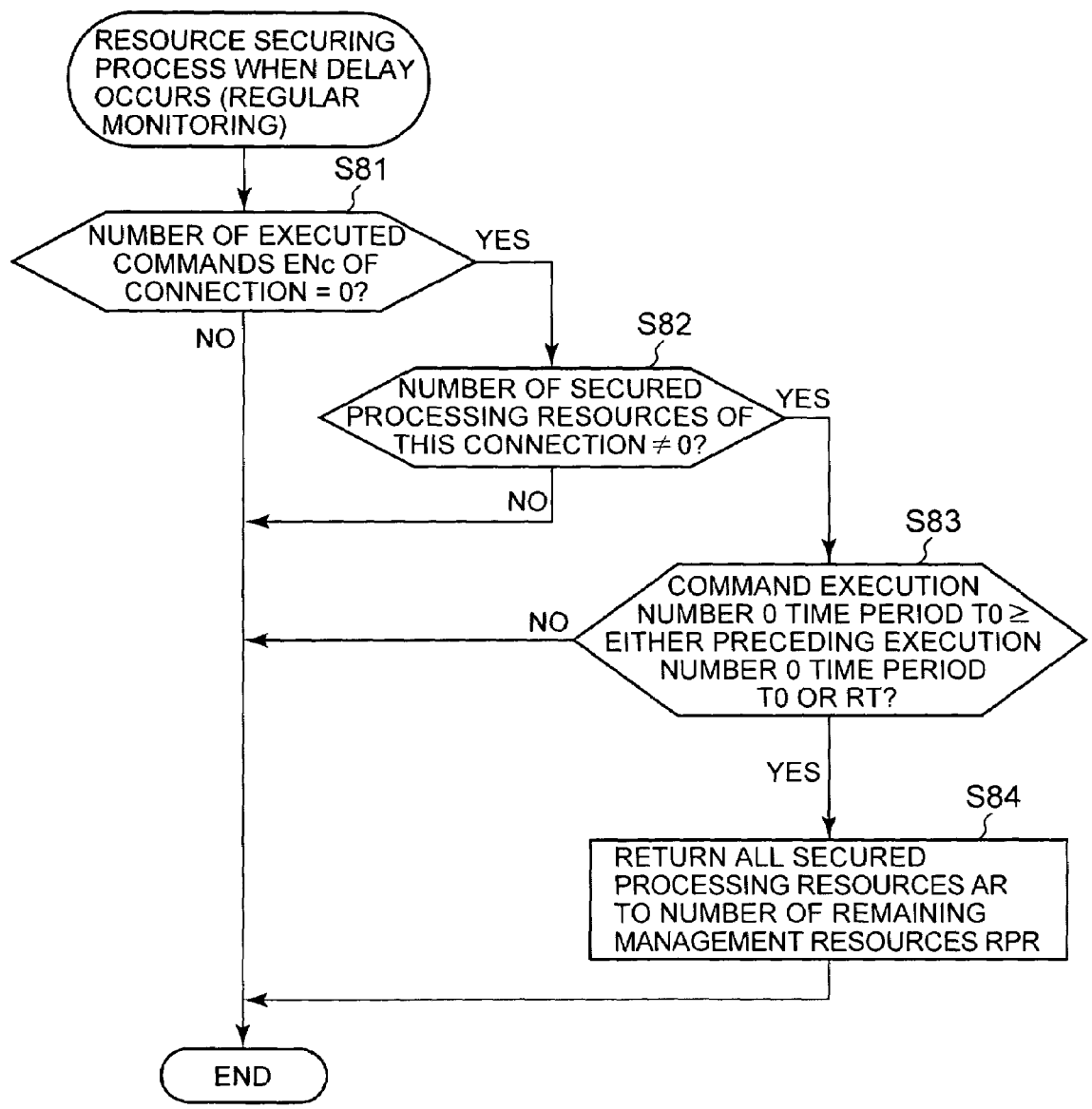
FIG. 18 is a flowchart showing a process for regularly monitoring the state of commands issued from a host.

FIG. 18 is a flowchart showing a different processing method for controlling either the securing or releasing of command processing resources that takes communication delay time into account. This flowchart is executed on a regular basis by the storage control apparatus 10.

The storage control apparatus 10 determines whether or not the number of executed commands ENc relative to a host 20 constitutes 0 (S81). When ENc=0 (S81: YES), the storage control apparatus 10 determines whether or not one or more command processing resources are allocated to this host 20 (S82).

When one or more command processing resources are allocated to a host 20 for which ENc=0 (S82: YES), the storage control apparatus 10 determines whether or not the elapsed time (T0) since the number of executed commands ENc became 0 has reached either the preceding executed-number-0 time period T0 or a prescribed time RT (S83).

The same as described hereinabove, when the time period T0 reaches either the preceding executed-number-0 time period T0 or a prescribed time RT (S83: YES), the storage control apparatus 10 returns all the command processing resources allocated to this host 20 to the resource pool (RPR) (S84). By contrast to this, when the time period T0 has not reached either the preceding executed-number-0 time period T0 or the prescribed time RT (S83: NO), the storage control apparatus 10 maintains the command processing resources allocated to this host 20 as-is.

This embodiment, which is constitutes as described above, also achieves the same effects as the above-mentioned first embodiment. In addition to this, in this embodiment, even when the storage control apparatus 10 and host 20 are far apart from one another, and communication delay time exists between the two, the command processing resources allocated to the host 20 are maintained until either the preceding executed-number-0 time period T0 or a prescribed time RT has elapsed.

Thus, even when the number of executed commands ENc becomes 0 and the commands received from a host 20 are interrupted, it is possible to prevent the command processing resources allocated to this host 20 from being immediately released and allocated to another host 20. Therefore, the total value of the number of commands allowed to be issued by the hosts can be prevented from exceeding the actual number of commands capable of being processed, and the occurrence of a QueueFull state can be held in check.

Fourth Embodiment

A fourth embodiment will be explained on the basis of FIGS. 19 and 20. In this embodiment, an order of priority is set in advance for the hosts 20, and command processing resources, which are managed by ports 101, are distributed in accordance with this order of priority.

FIG. 19 is a schematic diagram showing table T6 for managing the order of priority of the hosts 20 by port 101. This priority management table T6, for example, correspondingly manages host identification information for identifying the respective hosts 20, and the percentage of command processing resources distributed to the respective hosts 20.

As host identification information, for example, an iSCSI Name can be used. When information other than an iSCSI Name exists for enabling the identification of a host 20, this information can also be used. The percentage shows the percentage relative to all the command processing resources associated to a port 101. Totaling the percentages of all the hosts 20 registered in table T6 results in a value of either 100% or close to 100% ($Q(0)+Q(1)+Q(2)\ldots$). That is, the amount of command processing resources allocated to a specific host 20 constitutes a value obtained by multiplying the percentage set for this specific host 20 by the total number of command processing resources. An administrator, for example, sets the order of priority (distribution ratio) in table T6, taking into account the job priorities and job termination times of the respective hosts 20.

Figure 20:
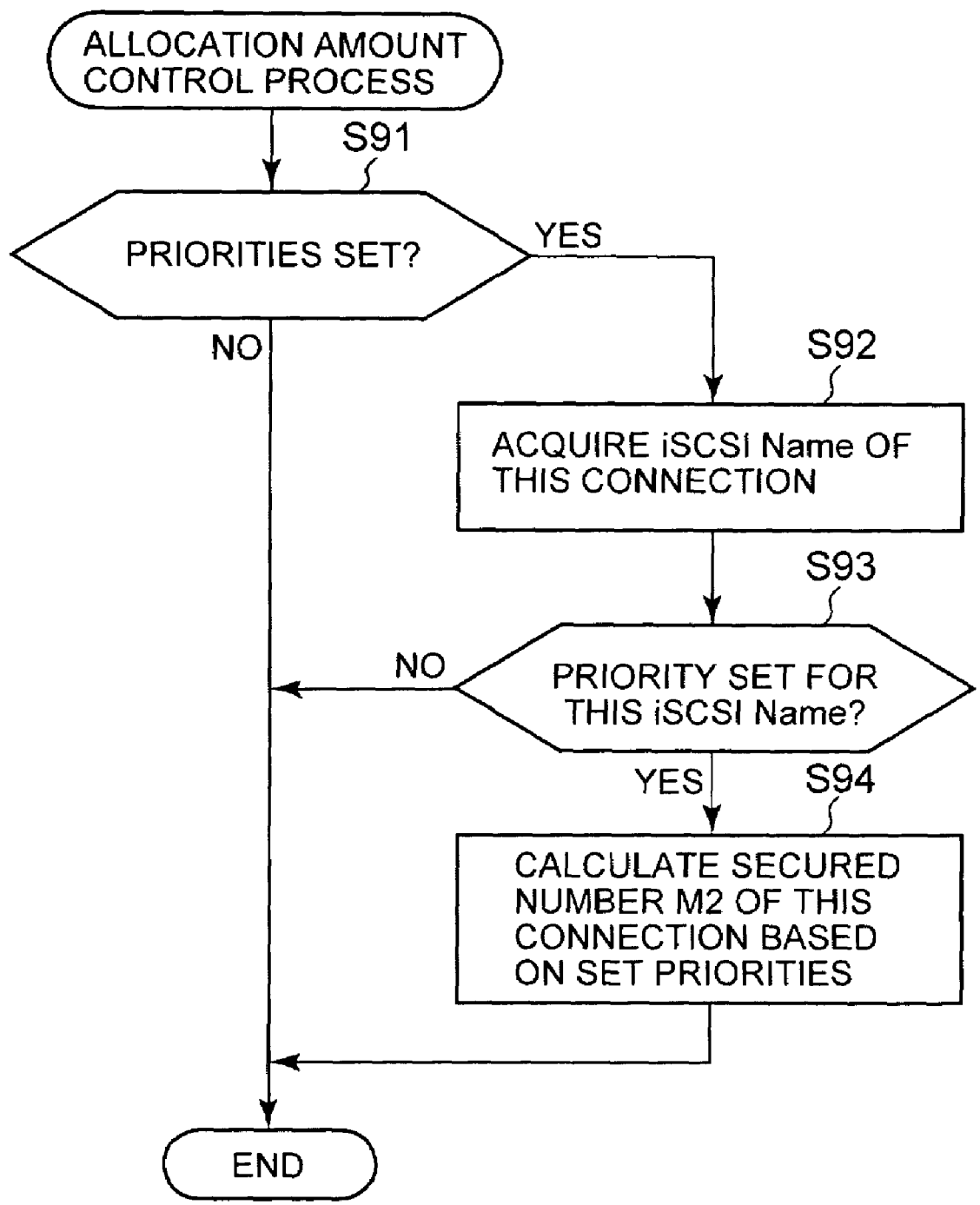
FIG. 20 is a schematic diagram showing a process for distributing command processing resources to hosts in accordance with an order of priority.

FIG. 20 is a flowchart showing a process for distributing command processing resources to hosts 20 sharing a single communication port 101. This process is executed by the storage control apparatus 10 for each host 20 connected to the respective communication ports 101.

The storage control apparatus 10 determines whether or not a priority has been set for a communication port 101 to which a host 20 targeted for resource distribution is connected (S91). When a priority has been set for the communication port 101 to which this host 20 is connected (S91: YES), the storage control apparatus 10 acquires the host identification information (iSCSI Name) of the host 20 (S92).

The storage control apparatus 10 determines whether or not the host identification information acquired from a host 20 is registered in table T6, in other words, it determines whether or not a priority has been set for this host 20 (S93). When a priority has been set for this host 20 (S93: YES), the storage control apparatus 10 calculates the amount M2 of command processing resources allocated to this host 20 on the basis of the priority set in table T6 (S94).

This embodiment, which is constituted as described above, also achieves the same effects as the above-mentioned first embodiment. In addition to this, since an order of priority can be allocated to the hosts 20 in this embodiment, it is possible, for example, to properly distribute command processing resources based on the priority of the jobs to be executed by the respective hosts 20. Therefore, the number of multiple commands issued from the respective hosts 20 in accordance with job priorities can be controlled on the storage control apparatus 10 side, enhancing usability.

Furthermore, the present invention is not limited to the embodiments described above. Those having skill in the art will be able to make various additions and changes without departing from the scope of the present invention.

What is claimed is:

1. A storage control apparatus capable of being connected to a plurality of host machines, which respectively issue commands, the storage control apparatus comprising:
   a plurality of communication ports for carrying out communications with said host machines respectively; and
   a control part, which respectively processes commands received by way of said communication ports from said host machines, and which respectively transmits results of processing to said host machines,
   wherein said control part:
   (1) securing, from among shared port resources provided in each said communication port, command processing resources for processing said commands, and allocating the command processing resources to said host machines;
   (2) respectively notifying said host machines of a receivable number, which indicates the number of commands capable of being received from said host machines, based on the amount of allocated said command processing resources; and
   (3) after response to a command from a host machine is completed, judging whether commands which are received by said host machines and not yet responded remain or not,
   when said commands do not remain, storing a time,
   while elapsed time from said time does not overrun a predetermined time, maintaining said command processing resources allocated on said host machines,
   when elapsed time from said time overruns said predetermined time, returning said command processing resources allocated on said host machines to said shared port resources.

2. The storage control apparatus according to claim 1, wherein said control part respectively allocates said command processing resources to said host machines such that said host machines can issue multiple said commands.

3. The storage control apparatus according to claim 1, wherein said control part approximately uniformly allocates said command processing resources of said shared port resources among the host machines of said host machines, which are executing said commands.

4. The storage control apparatus according to claim 1, wherein said control part maintains said command processing resources allocated to said host machines until said communication delay time reaches a preset prescribed response time, even when the number of said commands to be issued by said host machines decreases to or below a prescribed value.

5. The storage control apparatus according to claim 1, wherein said control part distributes said shared port resources among said host machines based on a preset order of priority.

6. The storage control apparatus according to claim 1, wherein said control part returns to said shared port resources a portion of said command processing resources allocated to said host machines, when the remaining amount of said shared port resources is not more than a preset prescribed value.

7. The storage control apparatus according to claim 1, wherein said control part returns to said shared port resources all of said command processing resources allocated to said host machine, when the number of said commands to be executed by said host machine decreases to a prescribed value.

8. The storage control apparatus according to claim 1, wherein said control part, when the total of said receivable number to be notified respectively to said host machines exceeds the maximum amount of said shared port resources, reduces said receivable number to be notified once again to said host machines, by returning to said shared port resources a portion of said command processing resources allocated to said host machines.

9. The storage control apparatus according to claim 1, wherein said control part, when the remaining amount of said shared port resources is not more than a preset prescribed value, returns to said shared port resources a portion of said command processing resources allocated to said host machines such that said command processing resources are approximately uniformly allocated to said host machines.

10. The storage control apparatus according to claim 1, wherein said control part returns to said shared port resources said command processing resources to be allocated to said host machine in accordance with a decrease in the number of said commands issued from said host machine.

11. The storage control apparatus according to claim 1, wherein said control part monitors changes in status of the number of said commands issued from said host machine, and when said number of commands transitions from a steady state to a decreasing state, returns to said shared port resources all of said command processing resources allocated to said host machine.

12. The storage control apparatus according to claim 1, wherein said control part, upon receiving said command from said host machine, determines whether or not the remaining amount of said shared port resources exceeds a preset prescribed threshold value, and when determined that said remaining amount exceeds said threshold value, increases said command processing resources to be allocated to said host machine, and when determined that said remaining amount is not more than said threshold value, decreases said command processing resources to be allocated to said host machine.

13. The storage control apparatus according to claim 1, wherein said host machines issue said commands by making sequence numbers, for identifying the issuing order of the commands, correspond to said commands, and wherein said control part calculates said receivable number by adding to said sequence number the amount of said command processing resources allocated to said host machine, when notifying said host machine of the processing results of said command received from said host machine.

14. The storage control apparatus according to claim 1, wherein said communication ports use the iSCSI protocol to carry out communications with said host machines.

15. A storage control apparatus, comprising: a plurality of communication ports, which are respectively connected via the iSCSI protocol to a plurality of host machines, each of which issues commands;

a superordinate communication part for communicating with said host machines respectively via said communication ports;

a subordinate communication part for communicating with a storage device;

a cache memory, which is used by said superordinate communication part and said subordinate communication part;

a control memory, which stores control information for managing a command processing resource for processing said command; and a control part, which is respectively connected to said superordinate communication part, said subordinate communication part, said cache memory, and said control memory, respectively processes said commands received by said superordinate communication part by way of said communication port from said host machines, and notifies said host machines of results of the processing from said superordinate communication part via said communication port, wherein said control part:

(1) respectively allocates to each of prescribed host machines a plurality of said command processing resources inside the shared port resources provided in each of said communication ports, so that the resources become approximately uniform among said prescribed host machines, which, of the host machines sharing said communication ports, are executing said commands;

(2) respectively calculates a receivable number, which indicates the number of commands capable of being received from said prescribed host machines, by adding a sequence number, for showing the command issuing order notified from said prescribed host machine, to the amount of said command processing resources allocated to said prescribed host machines, and respectively notifies said prescribed host machines of the calculated receivable number; and (3) after response to a command from a host machine is completed, judging whether commands which are received by said host machines and not yet responded remain or not, when such said commands do not remain, storing a time while elapsed time from said time does not overrun a predetermined time, maintaining command processing resources allocated on said host machines, when elapsed time from said time overruns said predetermined time, returning command processing resources allocated on said host machines to said shared port resources.

16. A method for controlling the number of commands executed in a storage control apparatus, in which shared port resources for respectively managing in each communication port the command processing resources for processing a command received from a host machine are provided, wherein the method executing the steps of:

allocating said command processing resources such that said host machine, which uses said communication port, is able to issue multiple said commands;

receiving sequence numbers indicating commands from said host machine, and the order of the commands; storing said sequence numbers;

determining whether or not any of said command processing resources allocated to said host machine has any free space;

notifying said host machine that processing is not possible when free space does not exist in said command processing resources;

processing, when free space exists in said command processing resource, said received command using the free space in said command processing resource;

comparing the remaining amount of said shared port resources with a prescribed threshold value;

increasing the amount of command processing resources to be allocated to said host machine when the remaining amount of said shared port resources exceeds said prescribed threshold value, by securing a first prescribed amount of command processing resources from the remaining amount of said shared port resource, and allocating same to said host machine;

decreasing the amount of command processing resources allocated to said host machine when the remaining amount of said shared port resources is not more than said prescribed threshold value, by returning to said shared port resources a second prescribed amount of command processing resources of said command processing resources already allocating to said host machine;

calculating a receivable number showing the number of commands capable of being received from said host machine, based on the amount of command processing resources allocated to said host machine and said received sequence number; and transmitting to said host machine said calculated receivable number and results of processing said received command.

17. The method for controlling the number of commands executed in a storage control apparatus according to claim 16, further comprising a step of:

setting said prescribed threshold value high when the total value of said receivable number transmitted to a plurality of said host machines exceeds the maximum amount of said shared port resources.

18. The method for controlling the number of commands executed in a storage control apparatus according to claim 16, further comprising the steps of:

monitoring changes in the number of said commands issued from said host machine;

determining whether or not the number of said commands has transitioned from a steady state to a decreasing state; and returning to said shared port resources all of said command processing resources allocated to said host machine when determined that the number of said commands has transitioned from a steady state to a decreasing state.

19. A storage control apparatus capable of being connected to a plurality of host machines, which respectively issue commands, the storage control apparatus comprising:

a plurality of communication ports for carrying out communications with said host machines; and a control part, which respectively processes commands received from said host machines via said communication ports, and which respectively transmits the results of processing to said host machines, wherein said control part:

(1) secures, from among shared port resources provided in each of said communication ports, command processing resources for processing said commands, and respectively allocates said command processing resources to said host machines; and (2) respectively notifies said host machines of a receivable number, which indicates the number of commands capable of being received from said host machines based on the amount of said allocated command processing resources; and (3) after response to a command from a host machine is completed, judging whether commands which are received by said host machines and not yet responded remain or not, when said commands do not remain, storing a time while elapsed time from said time does not overrun a predetermined time, maintaining said command processing resources allocated on said host machines, when elapsed time from said time overruns said predetermined time, returning said command processing resources allocated on said host machines to said shared port resources.

20. The storage control apparatus according to claim 19, wherein said control part respectively allocates said command processing resources to said host machines such that said host machines are capable of respectively issuing multiple said commands.

* * * * *